(12) United States Patent
Bouchard et al.

(10) Patent No.: US 11,620,514 B2
(45) Date of Patent: Apr. 4, 2023

(54) TRAINING ARTIFICIAL NEURAL NETWORKS WITH REDUCED COMPUTATIONAL COMPLEXITY

(71) Applicant: The Regents of the University of California, Oakland, CA (US)

(72) Inventors: Louis Bouchard, Los Angeles, CA (US); Khalid Youssef, Plainfield, CA (US)

(73) Assignee: The Regents of the University of California, Oakland, CA (US)

( * ) Notice: Subject to any disclaimer, the term of this patent is extended or adjusted under 35 U.S.C. 154(b) by 534 days.

(21) Appl. No.: 16/626,508

(22) PCT Filed: Jun. 28, 2018

(86) PCT No.: PCT/US2018/039944
§ 371 (c)(1),
(2) Date: Dec. 24, 2019

(87) PCT Pub. No.: WO2019/006088
PCT Pub. Date: Jan. 3, 2019

(65) Prior Publication Data
US 2020/0285956 A1    Sep. 10, 2020

Related U.S. Application Data

(60) Provisional application No. 62/690,805, filed on Jun. 27, 2018, provisional application No. 62/526,225, filed on Jun. 28, 2017.

(51) Int. Cl.
*G06N 3/08* (2006.01)
*G06N 3/04* (2006.01)
(Continued)

(52) U.S. Cl.
CPC .............. *G06N 3/08* (2013.01); *G06F 17/16* (2013.01); *G06N 3/04* (2013.01); *G06V 10/82* (2022.01); *G10L 15/16* (2013.01)

(58) Field of Classification Search
CPC . G06F 17/16; G06N 3/04; G06N 3/08; G06V 10/82; G10L 15/16
See application file for complete search history.

(56) References Cited

U.S. PATENT DOCUMENTS

| 9,240,184 B1 * | 1/2016 | Lin | G10L 15/142 |
| 10,176,435 B1 * | 1/2019 | Sarkar | G06N 20/00 |

(Continued)

FOREIGN PATENT DOCUMENTS

WO    2019006088 A1    1/2019

OTHER PUBLICATIONS

Hyun-Chui Choi,"Real-time Recognition of Facial Expression using Active Appearance Model with Second Order Minimization and Neural Network,"Jul. 16, 2007, 2006 IEEE International Conference on Systems, Man and Cybernetics,Oct. 8-11, 2006,pp. 1559-1563.*

(Continued)

*Primary Examiner* — Omar S Ismail
(74) *Attorney, Agent, or Firm* — KPPB LLP

(57) ABSTRACT

At least some embodiments of the present disclosure relate to a method of training an artificial neural network (ANN) for an artificial intelligence recognition. The method includes producing, by an ANN, outputs by feeding inputs of a training data set to the ANN; determining errors of the generated outputs from target outputs of the training data set; generating a first-order derivative matrix including first-order derivatives of the errors and a second-order derivative matrix including second-order derivatives of the errors; obtaining an approximation of the first-order derivative (Continued)

matrix or an approximation of the second-order derivative matrix by compressing the first-order derivative matrix or the second-order derivative matrix; and updating weights of the ANN based on the approximation of the first-order derivative matrix or the approximation of the second-order derivative matrix.

20 Claims, 26 Drawing Sheets

(51) Int. Cl.
    *G06F 17/16*    (2006.01)
    *G06V 10/82*    (2022.01)
    *G10L 15/16*    (2006.01)

(56) References Cited

U.S. PATENT DOCUMENTS

| | | | | |
|---|---|---|---|---|
| 2003/0093395 A1* | 5/2003 | Shetty | ............ | G06F 16/313 707/E17.084 |
| 2004/0133616 A1* | 7/2004 | Manevitz | ............ | G06F 17/13 708/443 |
| 2015/0371132 A1* | 12/2015 | Gemello | ............ | H01L 29/785 706/20 |
| 2016/0086078 A1* | 3/2016 | Ji | ............ | G06V 30/19127 382/157 |
| 2017/0083762 A1* | 3/2017 | Segalovitz | ............ | G06V 10/25 |
| 2018/0354630 A1* | 12/2018 | Nakhjavani | ............ | G06N 3/084 |
| 2020/0004752 A1* | 1/2020 | Majumdar | ............ | H04L 41/147 |

OTHER PUBLICATIONS

Jian-Xun Peng,"A New Jacobian Matrix for Optimal Learning of Single-Layer Neural Networks,"Jan. 14, 2008, IEEE Transactions on Neural Networks, vol. 19, No. 1, Jan. 2008,pp. 119-125.*
Derrick T. Mirikitani,"Recursive Bayesian Recurrent Neural Networks for Time-Series Modeling,"Dec. 28, 2009,IEEE Transactions on Neural Networks, vol. 21, No. 2, Feb. 2010, pp. 262-270.*
Vivek Veeriah,"Differential Recurrent Neural Networks for Action Recognition," Dec. 2015, Proceedings of the IEEE International Conference on Computer Vision (ICCV), 2015, pp. 4041-4046.*
International Preliminary Report on Patentability for International Application PCT/US2018/039944, Report dated Dec. 31, 2019, dated Jan. 9, 2020, 4 pgs.
International Search Report and Written Opinion for International Application No. PCT/US2018/039944, Search completed Aug. 17, 2018, dated Sep. 6, 2018, 12 pgs.

* cited by examiner

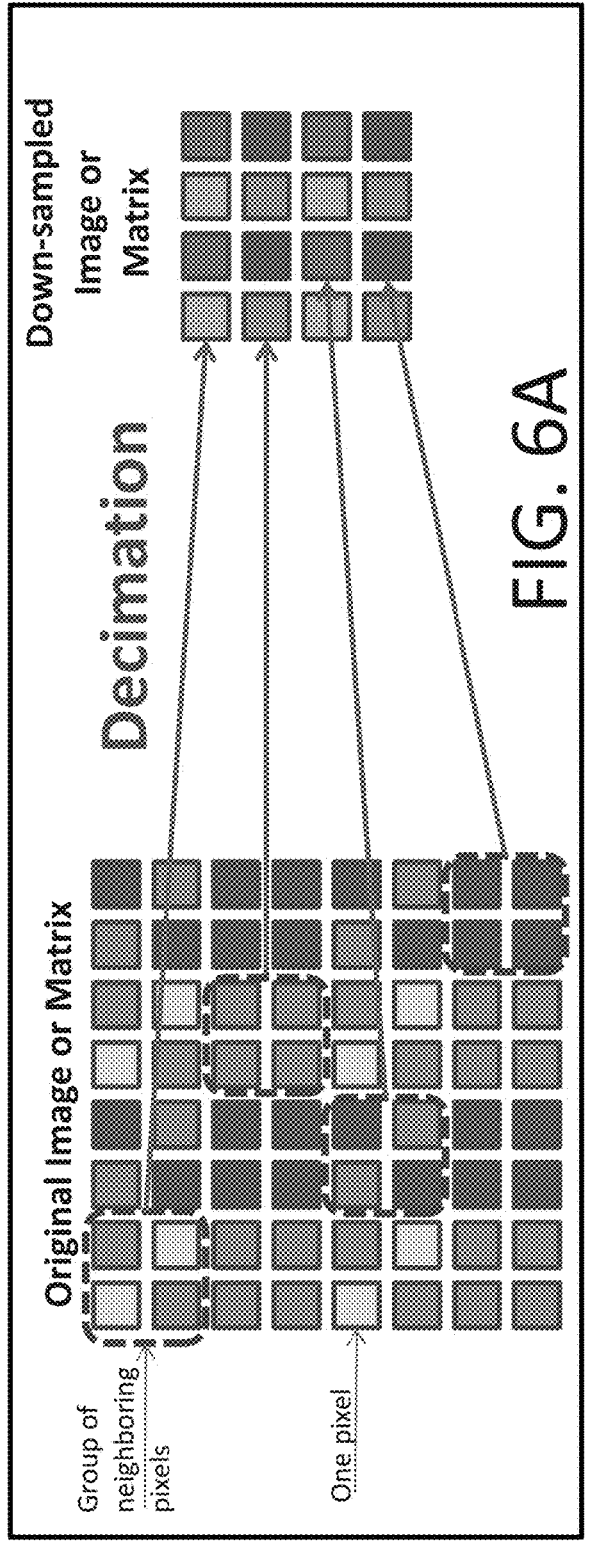
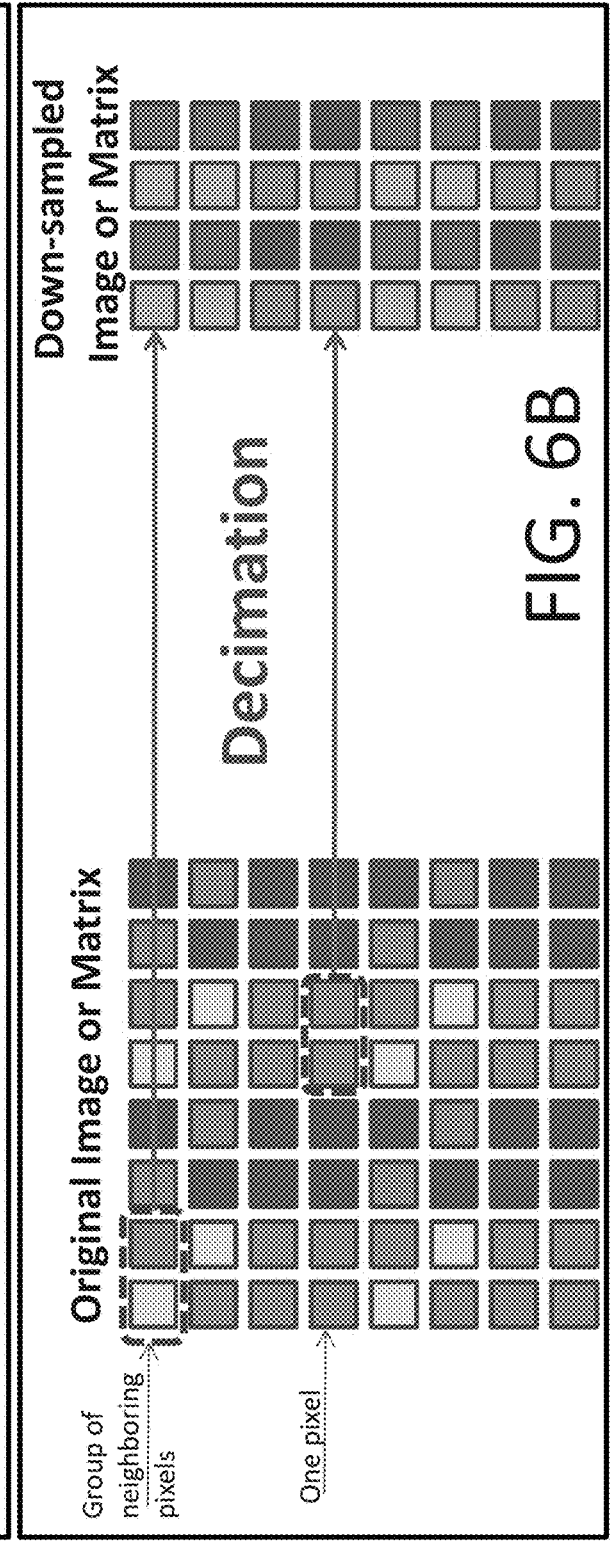

Iterations to Reach $L_\infty$

| AL-M2 (90%) | AL-M2 (40%) | L-M | SCG |
|---|---|---|---|
| 1039 | 464 | 385 | Did not reach goal |

FIG. 22

Time per Operation Comparison

| Operation | L-M | AL-M2 (90% H compression) |
|---|---|---|
| Hessian calculation: $J^T J$ | .48 sec | .07sec |
| Gradient Calculation: $J^T \bar{e}$ | .007sec | .002sec |
| Hessian inversion: $H^{-1}$ | .36sec | .03sec |

FIG. 23

Matrix Size Comparison

| Matrix | L-M | AL-M2 (90% H compression) |
|---|---|---|
| Jacobian | 4040X5002 | 4040X1667 |
| Hessian | 5002X5002 | 1667X1667 |

FIG. 24

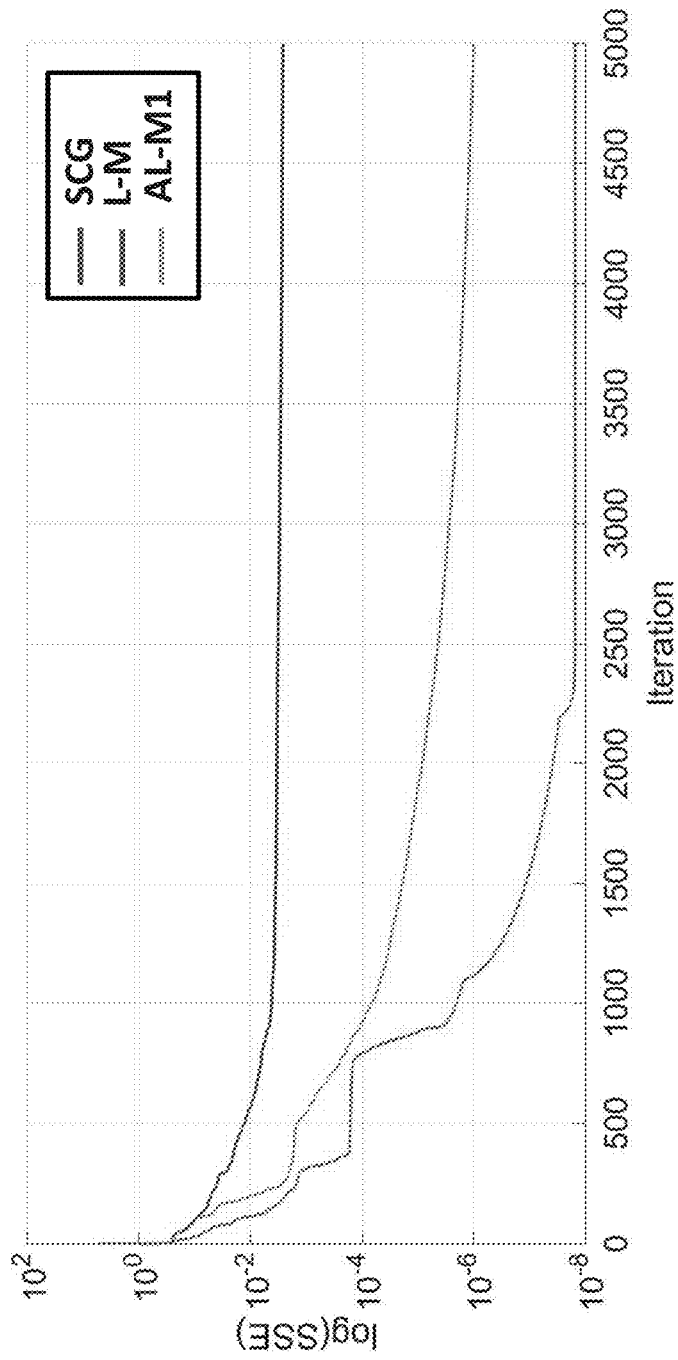

TRAINING ARTIFICIAL NEURAL NETWORKS WITH REDUCED COMPUTATIONAL COMPLEXITY

CROSS-REFERENCE TO RELATED APPLICATIONS

The instant application is a national stage of Application No. PCT/US2018/039944 titled, "Training Artificial Neural Networks with Reduced Computational Complexity" filed Jun. 28, 2018, which claims priority to U.S. Provisional Patent Application No. 62/526,225 titled, "Training Artificial Neural Networks with Reduced Computational Complexity" filed Jun. 28, 2017, and U.S. Provisional Patent Application No. 62/690,805 titled, "Training Artificial Neural Networks with Reduced Computational Complexity" filed Jun. 27, 2018, the disclosures of which are hereby incorporated by reference in its entirety.

TECHNICAL FIELD

The present disclosure relates to artificial neural networks (ANNs), and more particularly to a training method for ANN with a reduced computational complexity.

BACKGROUND

Artificial neural networks are a class of machine learning models that has been increasingly gaining popularity in the field of artificial intelligence. Large-scale ANN methods such as deep learning advance the state of the art in machine learning applications, yet they rely on first order and Hessian-free second order approximation training methods. However, the convergence of those training methods is slow to the point where convergence to a satisfying accuracy in a reasonable time is not possible when an application exceeds a certain degree of complexity.

SUMMARY OF THE INVENTION

Systems and methods for training ANNs in accordance with embodiments of the invention are illustrated. One embodiment includes a method of training an ANN for an artificial intelligence recognition, including producing, by an ANN, outputs by feeding inputs of a training data set to the ANN, determining errors of the generated outputs from target outputs of the training data set, generating a first-order derivative matrix including first-order derivatives of the errors and a second-order derivative matrix including second-order derivatives of the errors, obtaining an approximation of the first- and second-order derivative matrices or an approximation of the second-order derivative matrix by compressing the first-order derivative matrix or the second-order derivative matrix, and updating weights of the ANN based on the approximation of the first-order derivative matrix or the approximation of the second-order derivative matrix.

In another embodiment, the method further includes recognizing a face, a speech, handwriting, an image or an expression using the ANN.

In a further embodiment, the method further includes repeating the producing, the determining, the generating and the updating until a stopping criteria is met, wherein the stopping criteria including a maximum number of iterations, or a threshold for the errors.

In still another embodiment, the ANN is a multilayer perceptron (MLP) ANN model.

In a still further embodiment, the obtaining includes obtaining an approximation of the first-order derivative matrix and an approximation of the second-order derivative matrix by compressing the first-order derivative matrix and the second-order derivative matrix, and the updating includes updating weights of the ANN based on the approximation of the first-order derivative matrix and the approximation of the second-order derivative matrix.

In yet another embodiment, the obtaining includes decimating the first-order derivative matrix or the second-order derivative matrix horizontally and/or vertically.

In a yet further embodiment, the obtaining further includes interpolating a decimated instance of the first-order derivative matrix or the second-order derivative matrix.

In another additional embodiment, the obtaining includes compressing the first-order derivative matrix by selecting one or more columns of the first-order derivative matrix, and eliminating the selected one or more columns.

In a further additional embodiment, the obtaining includes compressing the first-order derivative matrix or by selecting one or more rows of the first-order derivative matrix, and eliminating the selected one or more rows.

In another embodiment again, the obtaining includes dividing the second-order derivative matrix into a plurality of blocks, and discarding one or more diagonal blocks of the plurality of blocks.

In a further embodiment again, the obtaining includes converting the matrix to be inverted from real space to a transform space, performing a data compression of the matrix in a transform space, inverting the matrix in the transform space, and performing an inverse-transform operation to the inverted matrix In still yet another embodiment, the updating includes calculating a weights update vector based on an approximation of the second-order derivative matrix, a transpose of the first-order derivative matrix or an approximation of the first-order derivative matrix and the errors, and updating weights of the ANN using the weights update vector.

In a still yet further embodiment, the weights of the ANN is updated using the weights update vector multiplied by a weights update vector coefficient, and the weights update vector coefficient is adjusted during each training iteration.

In still another additional embodiment, the method further includes adjusting the weights update vector coefficient based on an error history of past training iterations.

In a still further additional embodiment, the method further includes adjusting the weights update vector coefficient by a parameter control NN that receives the errors of past training iterations as inputs.

In still another embodiment again, the method further includes updating an order parameter, the order parameter determining a degree to which a current iteration behaves as a second order or a first order.

In a still further embodiment again, the order parameter is updated by a parameter control NN that receives the errors of past training iterations as inputs.

In yet another additional embodiment, the method is performed on at least two computing devices in a distributed computing system in parallel.

In a yet further additional embodiment, the parallelized method is directed using a blockchain ledger.

In yet another embodiment again, a system for training an (ANN) for an artificial intelligence recognition includes a processor, and a memory including an ANN training application, where the ANN training application directs the processor to produce, by an ANN, outputs by feeding inputs of a training data set to the ANN, determine errors of the generated outputs from target outputs of the training data set, generate a first-order derivative matrix including first-order derivatives of the errors and a second-order derivative matrix including second-order derivatives of the errors, obtain an approximation of the first- and second-order derivative matrices or an approximation of the second-order derivative matrix by compressing the first-order derivative matrix or the second-order derivative matrix, and update weights of the ANN based on the approximation of the first-order derivative matrix or the approximation of the second-order derivative matrix.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

Aspects of the present disclosure are best understood from the following detailed description when read with the accompanying drawings. It is noted that various features may not be drawn to scale, and the dimensions of the various features may be arbitrarily increased or reduced for clarity of discussion.

FIG. 6A illustrates a visual representation of a matrix being decimated by a compression performed horizontally and vertically.

FIG. 6B illustrates a visual representation of a matrix being decimated by compression performed vertically.

FIG. 22 illustrates a comparison of numbers of iterations taken by various training methods to achieve a convergence for a function fitting application.

FIG. 23 illustrates a comparison of time taken by a training process accelerated by compression of a Jacobian matrix and a Hessian matrix and a training process without the acceleration for a sample implementation.

FIG. 24 illustrates a comparison of matrix sizes used by a training process accelerated by compression of a Jacobian matrix and a Hessian matrix and a training process without the acceleration.

FIG. 25 illustrates a comparison of error convergence using various NN training methods for a 12-bit parity application.

FIG. 26 illustrates a comparison of numbers of iterations taken by various training methods to achieve a convergence for a 12-bit parity application.

DETAILED DESCRIPTION

Figure 1:
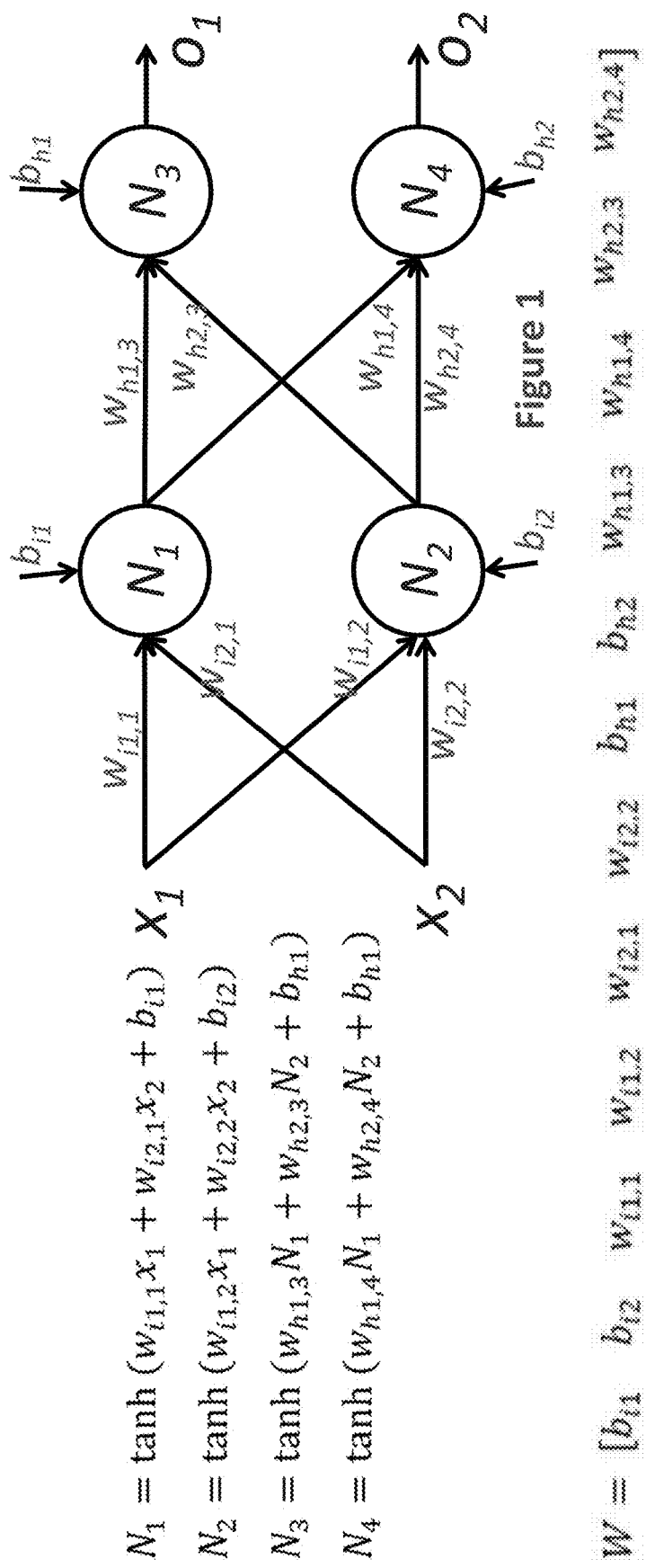
FIG. 1 illustrates an example of a multilayer perceptron (MLP) ANN model having two layers of perceptrons.

Common reference numerals are used throughout the drawings and the detailed description to indicate the same or similar components. Embodiments of the present disclosure will be readily understood from the following detailed description taken in conjunction with the accompanying drawings.

Various embodiments of the present disclosure are discussed in detail below. It should be appreciated, however, that the embodiments set forth many applicable concepts that can be embodied in a wide variety of specific contexts. It is to be understood that the following disclosure provides many different embodiments or examples of implementing different features of various embodiments. Specific examples of components and arrangements are described below for purposes of discussion. These are, of course, merely examples and are not intended to be limiting.

Embodiments, or examples, illustrated in the drawings are disclosed below using specific language. It will nevertheless be understood that the embodiments and examples are not intended to be limiting. Any alterations and modifications of the disclosed embodiments, and any further applications of the principles disclosed in this document, as would normally occur to one of ordinary skill in the pertinent art, fall within the scope of this disclosure.

In addition, the present disclosure may repeat reference numerals and/or letters in the various examples. This repetition is for the purpose of simplicity and clarity and does not in itself dictate a relationship between the various embodiments and/or configurations discussed.

Steepest descent based methods are used for training ANNs (also referred to as NNs). The goal of the training may be, e.g., minimization of a loss function, which may include, e.g., one or more error terms. The steepest descent based methods use first order derivatives of the loss function for training. However, steepest descent-based methods converge slowly and cannot converge to a high degree of accuracy in reasonable time for complex networks.

Hessian-free second-order approximation methods such as scaled conjugate gradient offer improvement in convergence over first-order methods. However, while convergence is fast in the early training stages, it becomes much slower as the error minima is approached. This "long-tail behavior" is a serious enough limitation that constrains its broad application to more complex applications.

Instead, second-order training methods use a Hessian matrix from Newton's method, and use second order derivatives of the loss function for training. The Hessian matrix can be approximated from, e.g., a Jacobian matrix (the so-called Gauss-Newton method). The Hessian matrix and the Jacobian matrix can be used together to obtain weights update vector at each iteration of the training process. Using the weights update vector, each element in the weights update vector updates a corresponding weight in the NN at each training iteration. Although second-order methods can have faster convergence rates than steepest descent based and Hessian-free second-order approximation methods, the use of the second-order training methods is currently limited to small and medium-size networks due to computational complexity of some steps of the second-order training methods. For example, for a step of calculating the inverse of the Hessian matrix, the computational complexity scales exponentially with matrix size.

At least some embodiments of the present disclosure describe an ANN training method that can drastically reduce computational complexity in the ANN training process. In some embodiments, the training method may operate in two phases. In the first phase, the training method replaces the Hessian matrix inverse and/or the Jacobian matrix multiplication with closely matching approximations calculated from compressed versions of the Hessian and Jacobian matrices. In the second phase, the training method compensates for errors in the weights update vector resulting from inaccuracies in the closely matching approximations.

The disclosed training methods use much fewer operations than comparative second-order methods that calculate the true matrix inverse and multiplication (without approximation), without sacrificing the fast convergence property of the comparative second-order methods. The disclosed training method can have a high impact on advancing the state of the art in machine learning applications of high computational complexities such as face and speech recognitions, by enabling the training of larger and more complex networks that may not be trained to the same level of accuracy using comparative training methods in a reasonable amount of time. Further, methods described herein can be performed in a highly parallelizable fashion, thereby enabling the usage of distributed computing systems to improve real-time efficiency.

In some embodiments, for example, the disclosed training methods can be used together with a method for least squares curve fitting (e.g., L-M method, also referred to as damped least-squares method) to train, e.g., a MLP ANN model. Although the disclosed training methods can work with the L-M method for training the MLP ANN model, it is to be understood that the disclosed training method may be applied to training of other classes of ANNs. To assist with understanding, the training methods described herein are discussed in contrast with, and as a modification of the L-M method, but similar modifications can be made to any number of ANNs to increase the speed and efficiency of training.

1. Computational Operations Involving Hessian and Jacobian Matrices

The L-M method is an iterative method to solve a problem of minimizing a nonlinear function. In the field of ANN, the existing L-M method is currently suitable for training small-size to medium-size problems due to the computational cost of matrix operations in the method which grows rapidly with the size of the problem.

In some embodiments, the basic unit of an ANN is the perceptron (also referred to as neuron). A MLP is a network of perceptrons organized into layers, such that the output of perceptrons in one layer of the MLP are connected to the inputs of perceptrons in the next layer. The MLP model may be trained to map a relation between the inputs to its first layer and the outputs of its last layer, using training data set with input-output pairs that are known already.

FIG. 1 illustrates an example of an MLP having two layers of perceptrons (neurons). As shown in FIG. 1, two neurons ($N_1$ and $N_2$) are in the first layer, and two neurons ($N_3$ and $N_4$) are in the second layer. ($x_1$ and $x_2$) are the inputs of the MLP model. ($o_1=N_3$ and $o_2=N_4$) are the outputs of the MLP model. ($w_{in,m}$ and $w_{hn,m}$) are the connection weights, each representing the strength of the connection between two corresponding nodes. ($b_{in}$ and $b_{hn}$) are the biases. (W) is a vector containing all the weights and biases in a specific order.

Figure 2:
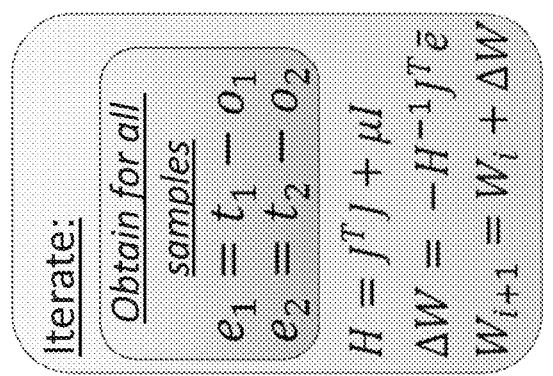
FIG. 2 illustrates a training process of the MLP of FIG. 1.

FIG. 2 illustrates a training process of the MLP of FIG. 1. The MLP may be trained using a number of input samples and their corresponding outputs. (t1 and t2) are the target outputs. (e1 and e2) are the errors from each output. The errors from all training samples are stored in the error vector ($\bar{e}$). The partial derivative of each error with respect to each component in the weight vector is calculated to obtain each row in a Jacobian matrix (J) as shown in FIG. 2. The Hessian matrix (H) is approximated from (J), where (I) is the identity matrix. ($\mu$) is a variable parameter (also referred to as order parameter) that determines the degree to which the process behaves as a second order or a first order method at each iteration of the training process. ($J^T\bar{e}$) is referred to as gradient vector. ($\Delta W$) is the weights update vector calculated from the inverse of the Hessian, a transpose of the Jacobian and the errors. (i) is the iteration number corresponding each iteration of the training process.

Figure 3:
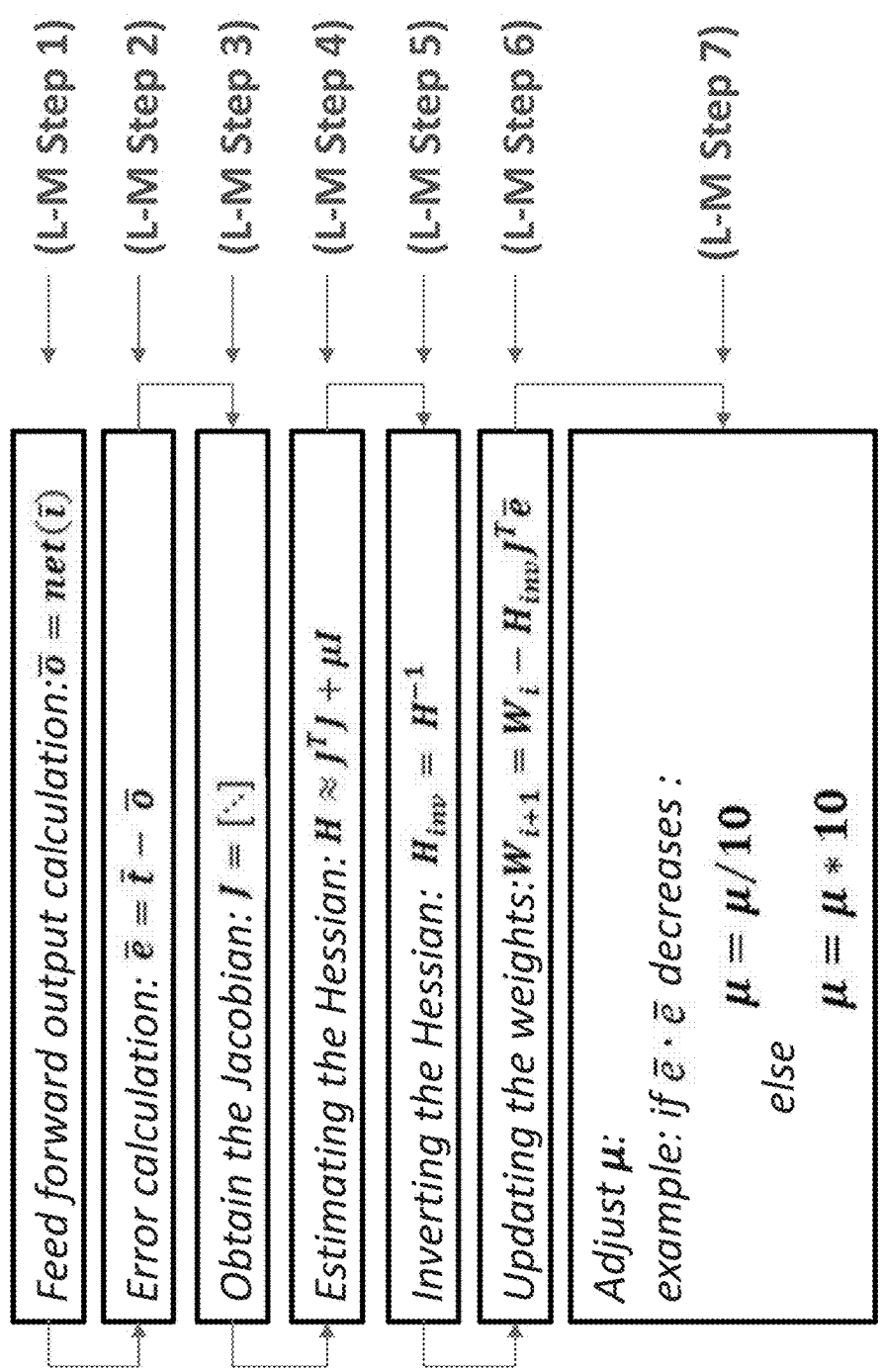
FIG. 3 illustrates various steps of a training process based on the Levenberg-Marquardt (L-M) method.

FIG. 3 illustrates various steps of a training process based on a L-M method. An output vector ($\bar{o}$) is generated by performing a feed forward output calculation (L-M Step 1), where $\bar{o}$ is obtained by iterating the network on an input vector ($\bar{i}$). An error calculation is performed (L-M Step 2) to obtain an error vector where $\bar{e}$ is the desired target output vector ($\bar{t}$) minus $\bar{o}$. A Jacobian matrix is obtained (L-M Step 3) and a Hessian matrix is estimated from the Jacobian (L-M Step 4). The Hessian matrix is inverted (L-M Step 5), and the weights are updated (L-M Step 6). FIG. 3 further includes adjusting the variable parameter μ (L-M Step 7). In numerous embodiments, μ is adjusted based on the error vector. In some embodiments, the adjustment is based on a calculations performed with the error vector. For example, the dot product of the error vector with itself can be used to obtain a scalar indicating how μ should be adjusted. In some embodiments, if the dot product decreases compared to the dot product produced by the previous iteration, then μ is set to μ/10, and it the dot product increases, μ is set to μ*10. However, any number of adjustment equations can be used as appropriate to the requirements of a given application of an embodiment of the invention. The process can be repeated, in multiple iterations until a stop condition is met. In many embodiments, the stop condition is reaching a maximum number of iterations. However, the stop condition can be based on any number of metrics including, but not limited to, a desired cross product value, a maximum u value, any other metric that is desired as a stop condition, and/or a combination of different metrics.

Figure 4:
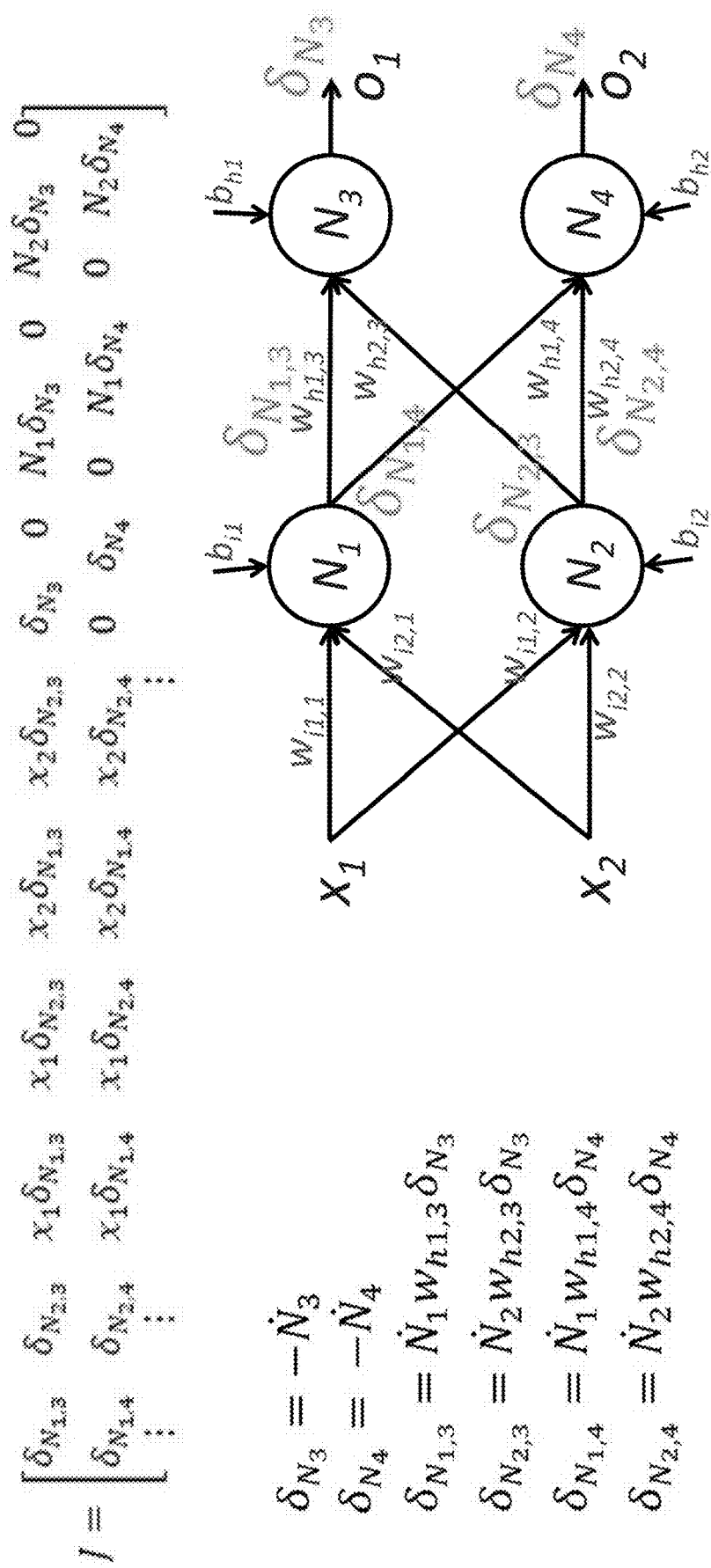
FIG. 4 shows components of a Jacobian matrix associated with the MLP of FIG. 1.

FIG. 4 shows components of a Jacobian matrix associated with the MLP of FIG. 1. The components of the Jacobian matrix (J) is denoted as derivatives of N1, N2, N3, and N4. Since the MLP of FIG. 1 has two outputs (other models may have different numbers of outputs), each training pattern as shown in FIG. 4 may occupy two rows in the Jacobian matrix. The calculation of the derivatives is repeated for each training pattern, and the corresponding rows are appended to the Jacobian matrix.

Figure 5:
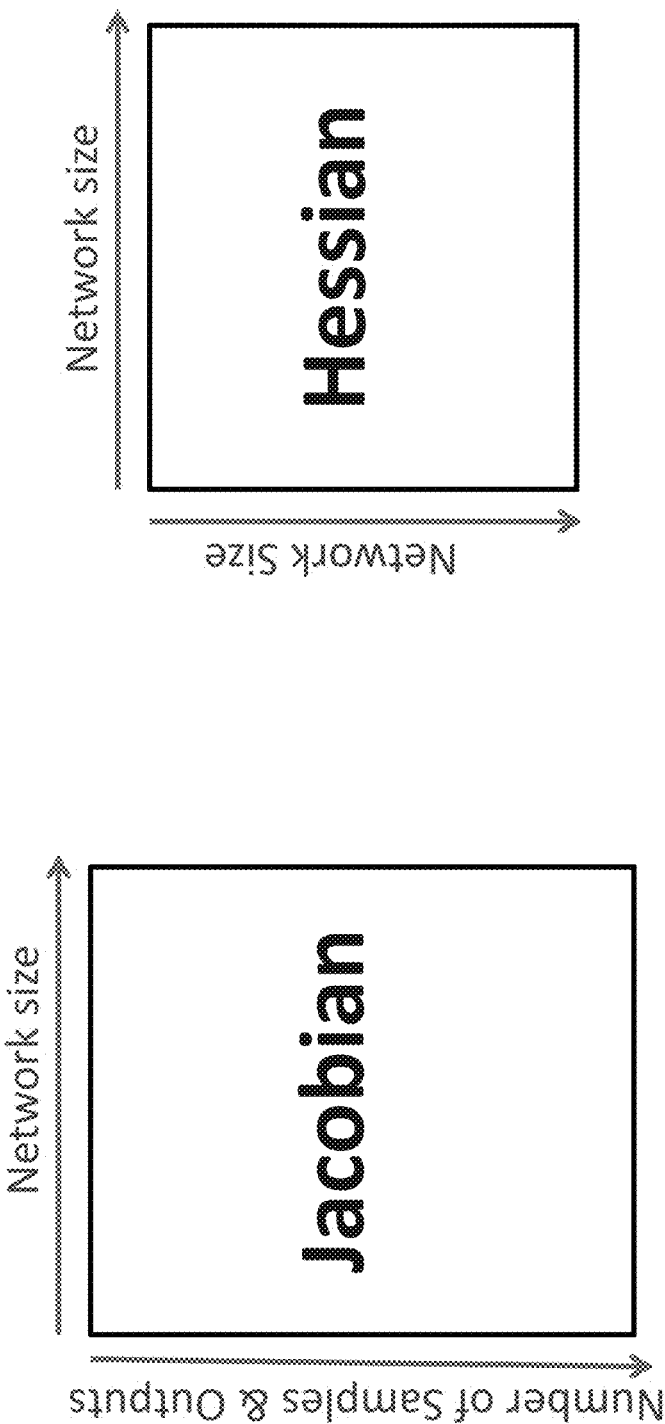
FIG. 5 illustrates the relationship between the number of weights and biases and the size of the Jacobian and Hessian matrices, and the number of training samples and the size of the Jacobian matrix.

At least a portion of the computational cost in the L-M method is due to the matrix inversion operation involving the Hessian, and the matrix multiplication operations involving the Jacobian and Hessian matrices. In some embodiments, for a given matrix size, matrix inversion may be the more expensive operation of the two operations. FIG. 5 illustrates sizes of a Jacobian matrix and a Hessian matrix. For Jacobian matrix (J), the number of columns is equal to the number of weights and biases which increases with the size of the NN, and the number of rows is equal to number of training samples times number of outputs. For the Hessian matrix (H), the number of rows and columns are both equal to the number of weights and biases and increase simultaneously with the size of the network.

2. Decimation (Compression) and Interpolation (Decompression)

Decimation is a process of compression to produce a reduced-size representation of a matrix. Compression may be performed in, e.g., a real space, where the matrix is operated on directly. Alternatively, the compression is performed in a transform (conjugate) space. A matrix may be represented by a two-dimensional (2D) image, where matrix elements are represented by image pixels.

FIG. 6A illustrates a visual representation of a matrix being decimated by compression of 50% horizontally and 50% vertically. Decimation may be performed in real space by replacing each group of neighboring pixels with one pixel that has a value equal to the weighted average of the group. The resolution of the original image (and the size of the matrix) may be reduced by 50% both horizontally and vertically, producing a decimated image (matrix) with 25% of the size of the original image.

FIG. 6B illustrates a visual representation of a matrix being decimated by compression of 50% vertically. The original image resolution (and the size of the matrix) may be reduced by 50% vertically, producing a decimated image (matrix) with 50% of the size of the original image.

Figure 7:
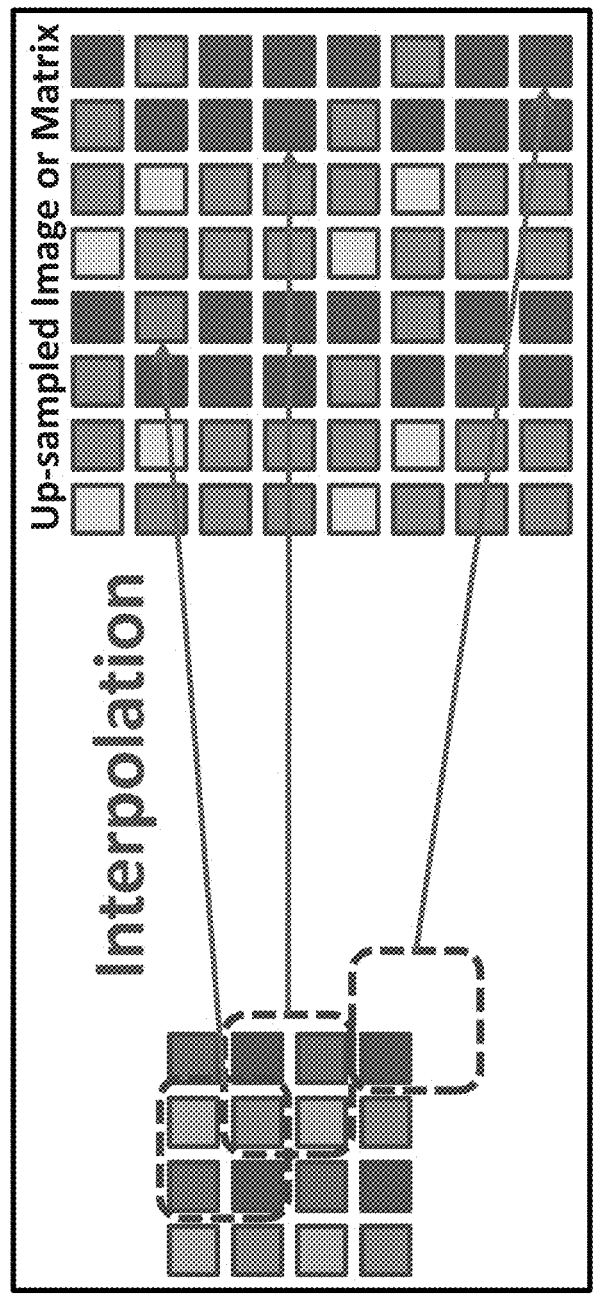
FIG. 7 illustrates a visual representation of a matrix being up-sampled by interpolation.

Interpolation refers to a method of decompression to produce an increased-size representation of a matrix. Similar to compression, decompression can be performed in real or transform space. FIG. 7 illustrates a visual representation of a matrix being up-sampled by interpolation of 200%. Interpolation may be performed in real space by adding new pixels with values inferred from pixels in the surrounding location. Interpolation by 200% is applied to the decimated image of FIG. 6A, producing a restored image with the same resolution as the original image of FIG. 6A. In some embodiments, some information may be lost in the restored image and the restored image may not be an exact replica of the original image of FIG. 6A. In some embodiments, operating in a transform space instead of real space may be less computationally efficient, but may enhance the quality of the restored image.

In at least some embodiments of the present disclosure, notations <, ^, > and v symbols refer to vertical compression, horizontal compression, vertical decompression and horizontal decompression, respectively. For example, $\hat{J}$ refers to a Jacobian matrix compressed horizontally. $\check{J}$ refers to a Jacobian matrix decompressed horizontally. $\overset{<}{H}$ refers to a Hessian matrix compressed vertically and horizontally.

3. Reducing Computation Complexity Through Compression

In some embodiments, although Jacobian matrix (J) and Hessian matrix (H) are computationally expensive to evaluate due to their size, the matrices may contain information that either has negligible effect on training, or can be compensated for if discarded. Discarded information may ultimately result in changes to the weights update vector (ΔW) that are referred to as distortion. The disclosed method may compress the matrices before the weights of the ANN model are updated during each iteration.

The distortion may be compensated for by, e.g., increasing the number of training iterations, and/or multiplying (ΔW) by an adjustable parameter. In some other embodiments, other methods may also be used to reduce and/or compensate for distortion in (ΔW). In order to reduce computational complexity, the matrix may be compressed prior to operating on it, through methods that preserve the information that is most relevant to training in the current training iteration and discard at least some of the rest of the information. These methods can be used either separately or together, where the optimal combination of methods and their parameters may depend on the computational recourses (e.g., memory and processing power) and the application at hand.

In some embodiments, the compression may be performed on the Hessian and/or the Jacobian depending on the application at hand. For example, compressing the Hessian may affect, e.g., the L-M Step 5 of FIG. 3. Compressing the Jacobian horizontally may affect, e.g., the L-M Steps 4, 5, and 6 of FIG. 3. Compressing the Jacobian vertically may affect, e.g., the L-M Steps 4, and 6 of FIG. 3. We note that obtaining the Jacobian (as in L-M Step 3 of FIG. 3) may also be computationally expensive. However, the rows of the Jacobian may be calculated independently, which means that this step can be easily accelerated using, e.g., parallel processing.

4. Accelerating L-M Method by Direct Compression of the Hessian Matrix

Figure 8:
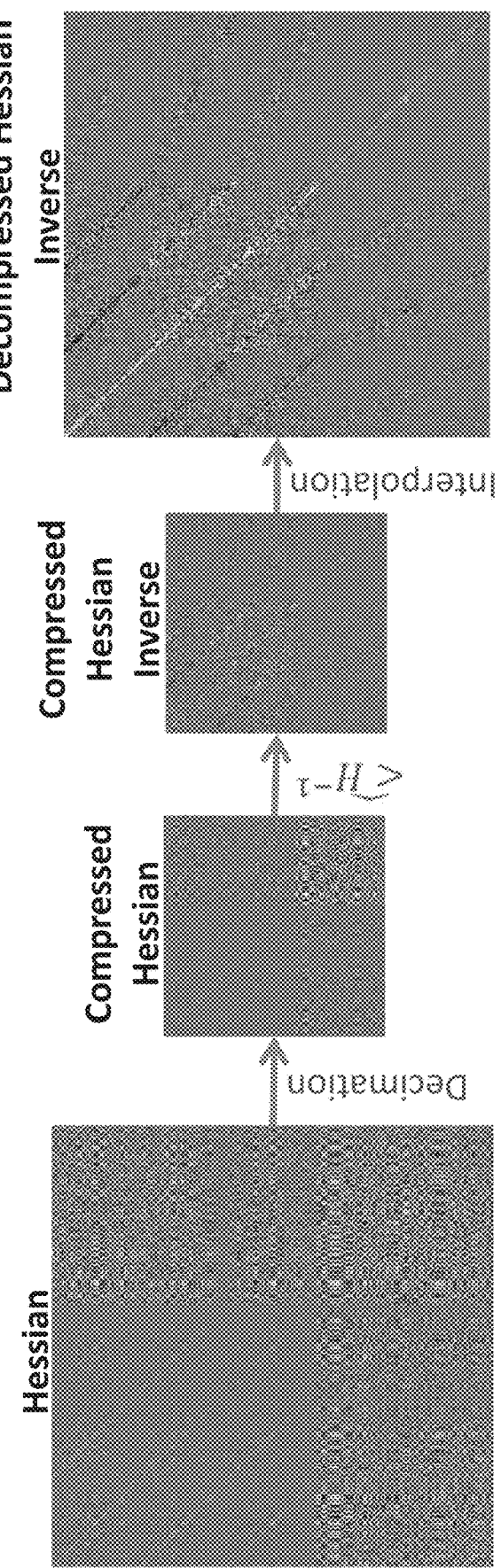
FIG. 8 illustrates a visual representation of a Hessian matrix being compressed, and its approximate inverse being obtained by interpolating the inverse of the compressed matrix.

In some embodiments, the Hessian matrix may be decimated (compressed) by applying the same compression ratio (or different compression ratios) horizontally and vertically. The inverse of the compressed Hessian is calculated and the result is decompressed yielding an approximation that may replace the L-M Step 5 of FIG. 3. FIG. 8 illustrates a visual representation of a Hessian matrix being compressed. The compression ratio may be, e.g., 50% vertically and horizontally. This method reduces the computational and memory cost to calculate the inverse of the Hessian (e.g., in the L-M steps 5 of FIG. 3) since the inverse is performed on a matrix that is smaller than the original Hessian.

Information lost during the compression/decompression process will result in distortion in calculating the weights update vector ($\Delta W$). In order to compensate for this, the L-M Step 6 of FIG. 3 may be modified by multiplying ($\Delta W$) by a parameter ($\gamma$) (referred to as weights update vector coefficient) which is adjusted during each iteration. In some embodiments, parameter ($\gamma$) is adjusted each iteration in a similar fashion to adjusting parameter ($\mu$). In some other embodiments, other methods may also be used to compensate for or reduce distortion.

Figure 9:
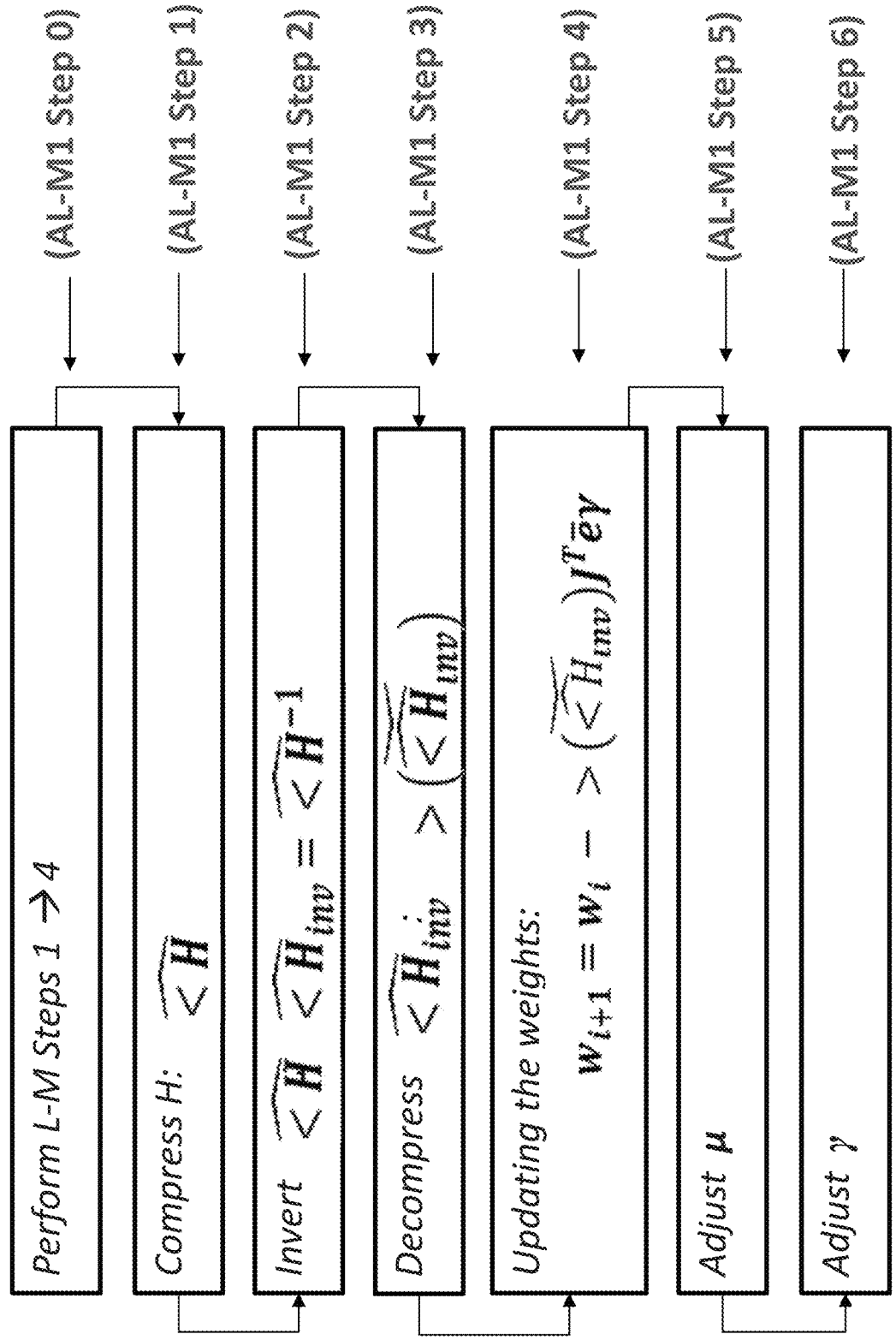
FIG. 9 illustrates various steps of a training process based on L-M method accelerated by direct compression of Hessian matrix.

FIG. 9 illustrates various steps of a training process based on a Levenberg-Marquardt (L-M) method accelerated by direct compression of a Hessian matrix. The training process of FIG. 9 begins by performing L-M Steps 1-4 (collectively AL-M Step 0) as illustrated with respect to FIG. 3 above. The Hessian is then compressed horizontally and vertically (AL-M1 Step 1), and the compressed Hessian is then inverted (AL-M1 Step 2). The inverted compressed Hessian is then decompressed horizontally and vertically (AL-M1 Step 3), and the weights are updated (AL-M1 Step 4). In the illustrated embodiment, the updated weights are the result of calculating the previous weights minus a decompressed version of the compressed Hessian multiplied by the transposed Jacobian, the error vector, and the weights update vector coefficient. The adjusting parameter and the weights update vector coefficient are then updated (AL-M1 Steps 5 and 6, respectively).

Figure 10:
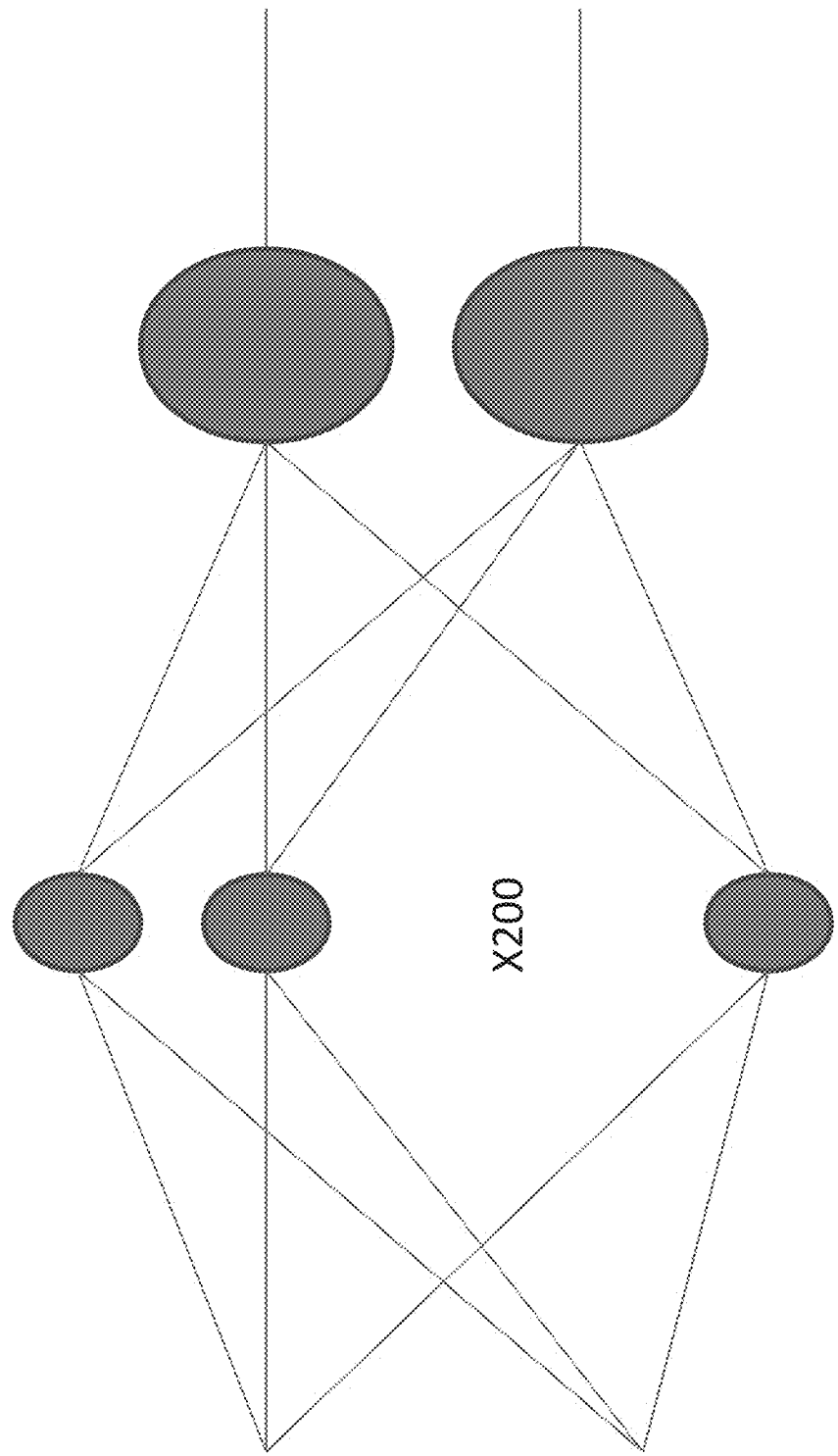
FIG. 10 illustrates a two-layer MLP associated with Hessian matrix of FIG. 8.

FIG. 10 illustrates a two-layer MLP associated with a Hessian matrix of FIG. 8. In some embodiments, for example, the MLP may have, e.g., two inputs, two outputs, 200 neurons in the first layer and two neurons in the second layer. The total number of weights may be, e.g., 2 (inputs) *200 (first layer neurons)+200 (biases of first layer neurons)+200 (first layer neurons)*2 (second layer neurons)+2 (biases of second layer neurons)=1002. Thus, the original size of the Hessian matrix may be, e.g., 1002×1002. The size of the compressed Hessian may be, e.g., 501×501. The number of training samples may be, e.g., 3334. The size of the original Jacobian may be, e.g., 3334×1002.

5. Accelerating L-M Method by Compression of the Jacobian Matrix

Figure 12:
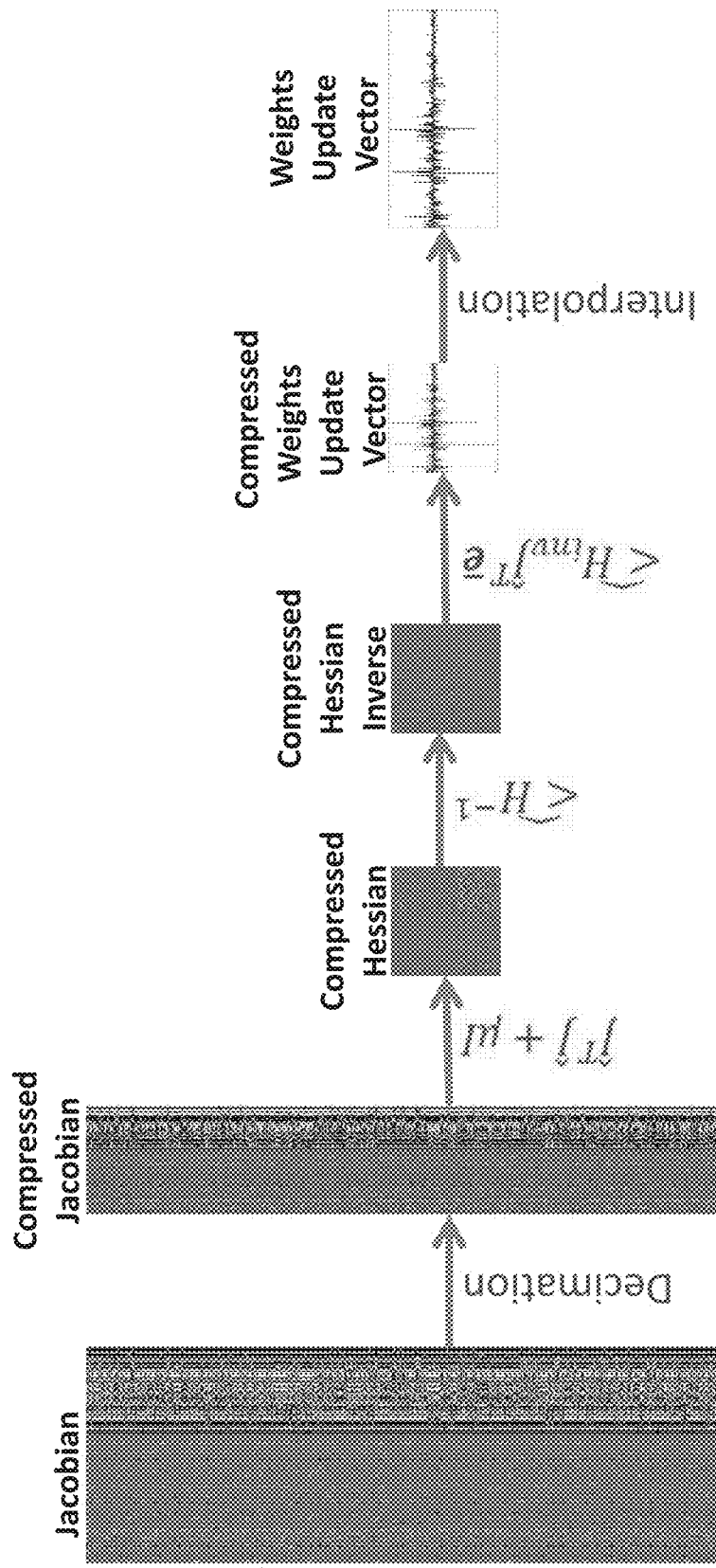
FIG. 12 illustrates a visual representation of the training process defined in FIG. 11.

In some embodiments, the Jacobian matrix is decimated (compressed) in, e.g., a horizontal direction. In some embodiments, compressing each direction of the Jacobian may affect accuracy as well as acceleration of different steps in the process. For example, compression horizontally may accelerate, e.g., the L-M steps 4, 5 and 6 of FIG. 3. Compression vertically may accelerate, e.g., the L-M steps 4 and 6 of FIG. 3. FIG. 12 illustrates a visual representation of a Jacobian matrix being compressed and the steps involved for retrieving the weights update vector. The compression ratio may be, e.g., 50% horizontally.

Figure 11:
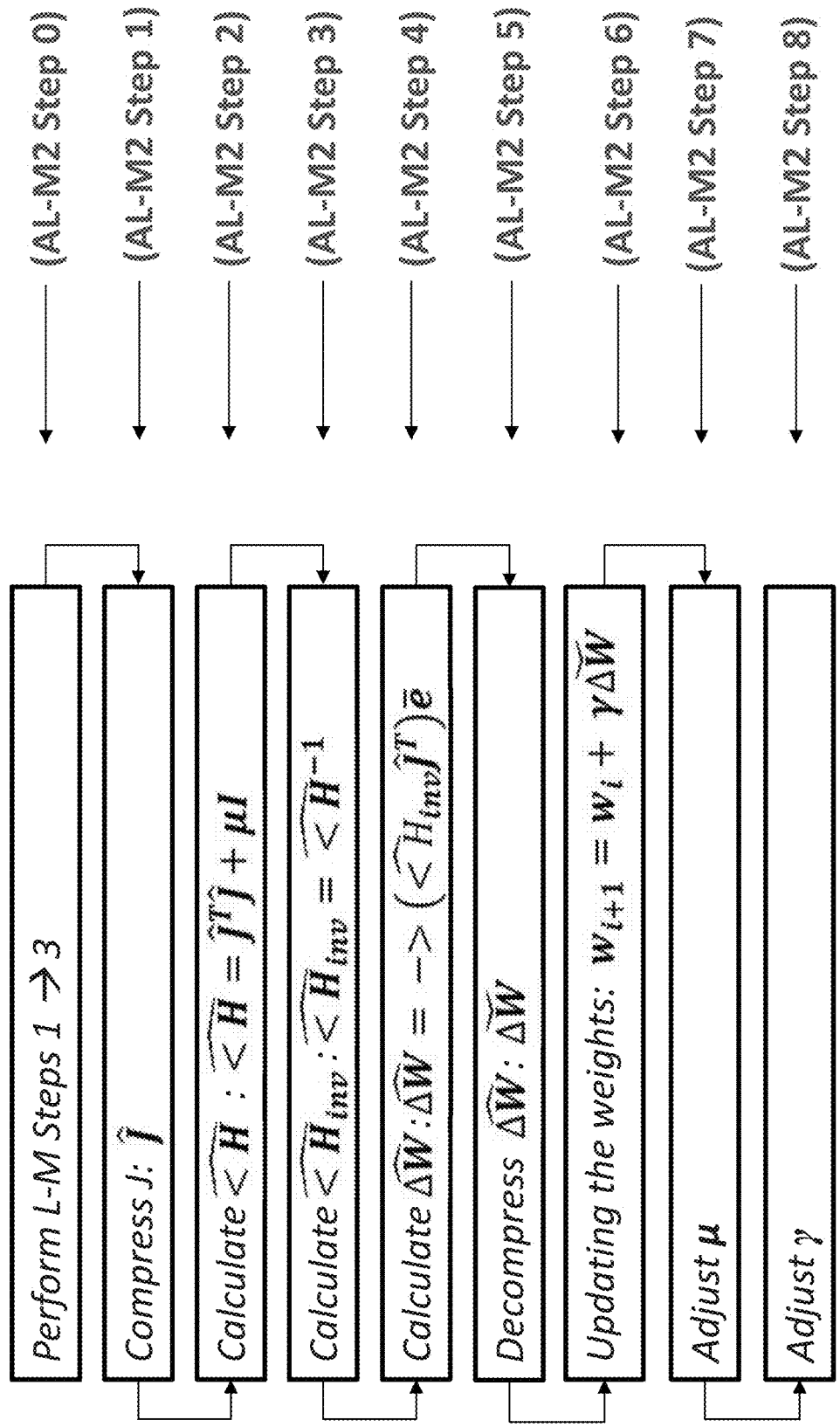
FIG. 11 illustrates various steps of a training process based on L-M method accelerated by compression of the Jacobian matrix.

FIG. 11 illustrates various steps of a training process based on a L-M method accelerated by compression of a Jacobian matrix. The process illustrated in FIG. 11 includes performing the L-M Steps 1-3 described above with respect to FIG. 3 (collectively AL-M2 Step 0). The Jacobian is compressed horizontally (AL-M2 Step 1), and a compressed Hessian is calculated (AL-M2 Step 2). In numerous embodiments, the compressed Hessian is a vertically and horizontally compressed Hessian which is generated by multiplying the vertically compressed Jacobian with a transposed copy of the horizontally compressed Jacobian, and adding the identity matrix which has been multiplied by u. The inverse of the compressed Hessian is calculated (AL-M2 Step 3), and a compressed weights update vector ($\Delta W$) is calculated (AL-M2 Step 4) by multiplying the inverse of the compressed Hessian by the transposed horizontally compressed Jacobian and multiplying the resulting matrix by the error vector The compressed weights update vector is decompressed (AL-M2 Step 5) and the weights are updated. In numerous embodiments, the updated weights are the result of adding the previous weights to the decompressed weights update vector multiplied by the weights update vector coefficient. The adjusting parameter and the weights update vector coefficient are then updated (AL-M2 Steps 7 and 8, respectively).

Figure 13:
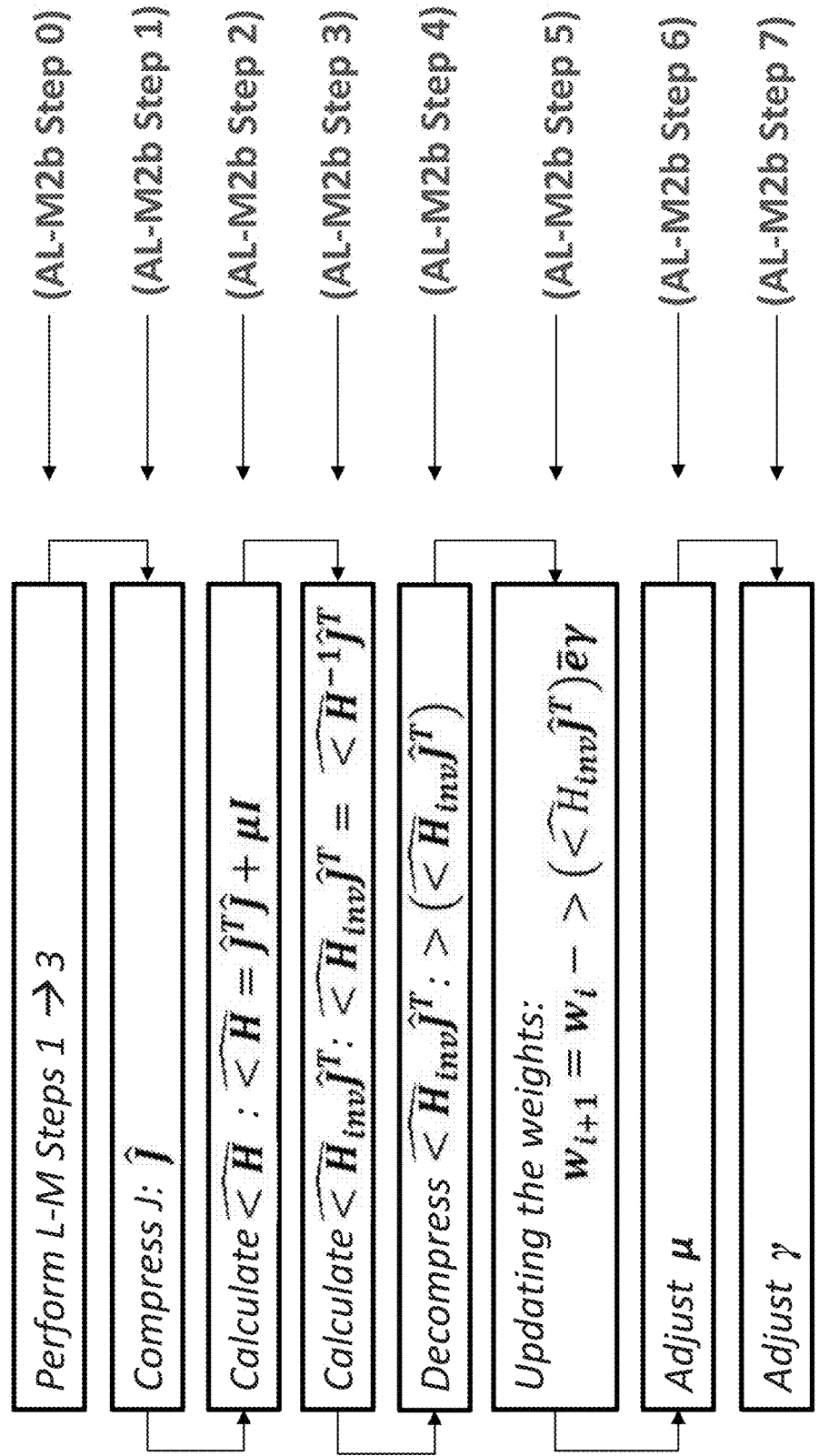
FIG. 13 illustrates various steps of a training process based on L-M method accelerated by compression of the Jacobian matrix, according to some alternative embodiments of the present presentation, specifically in the retrieval of the decompressed weight update vector.
Figure 14:
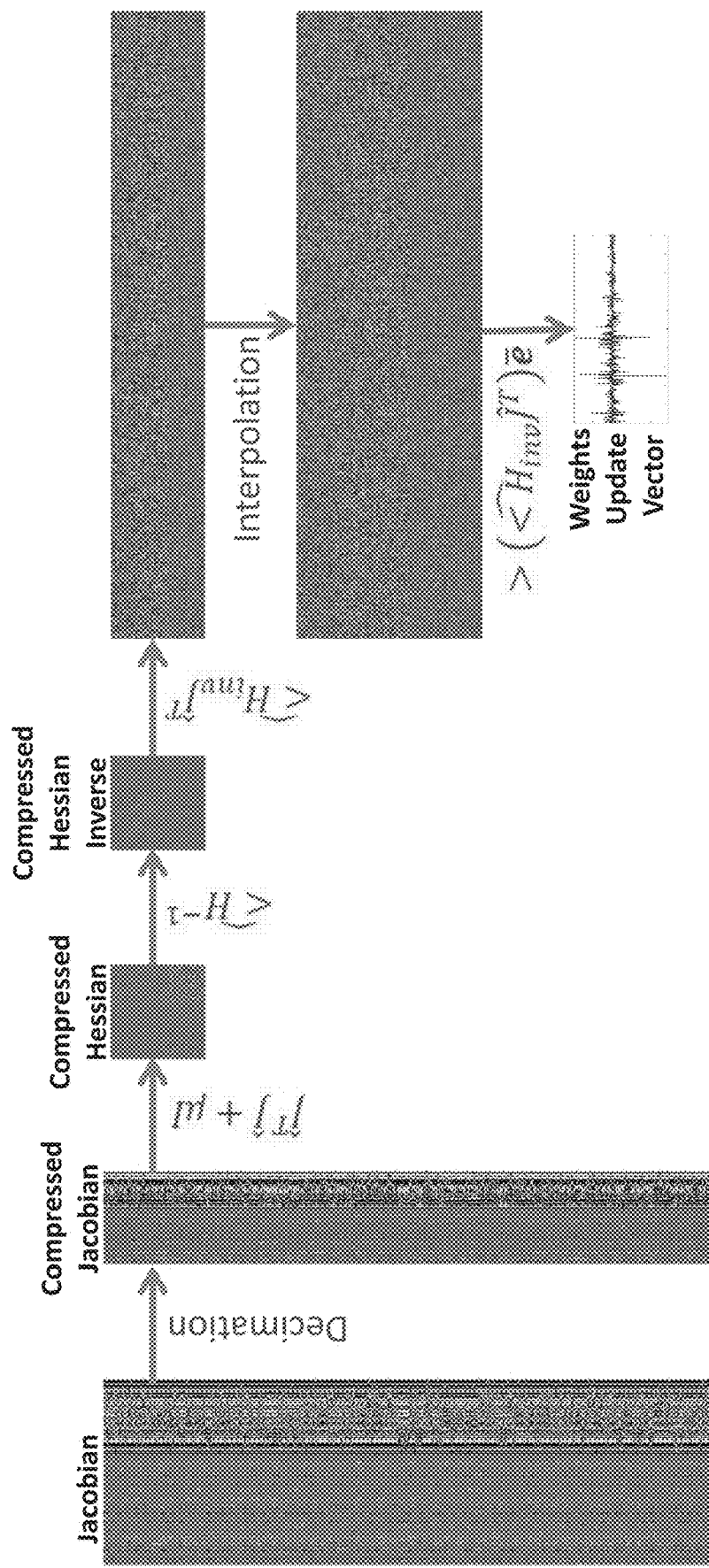
FIG. 14 illustrates a visual representation of the training process defined in FIG. 13.

FIG. 14 illustrates a visual representation of a Jacobian matrix being compressed, where the weights update vector is retrieved according to some alternative embodiments of the present presentation. FIG. 13 illustrates various steps of a training process based on a L-M method accelerated by compression of a Jacobian matrix, according to some alternative embodiments of the present presentation. The process illustrated in FIG. 13 involves performing L-M Steps 1-3 as illustrated in FIG. 3 (collectively AL-M2$b$ Step 0). The Jacobian is then horizontally compressed (AL-M2$b$ Step 1) and a horizontally and vertically compressed Hessian is calculated (AL-M2$b$ Step 2) in a manner similar as described with respect to FIG. 11. The compressed Hessian is inverted and multiplied by the transpose of the horizontally compressed Jacobian (AL-M2$b$ Step 3). The product of the compressed inverted Hessian and the transposed horizontally compressed Jacobian is then decompressed vertically (AL-M2$b$ Step 4) and the weights are updated (AL-M2$b$ Step 5). In many embodiments, the weights are updated such that the new weights are the result of subtracting the vertically decompressed product of the compressed inverted Hessian and the transposed horizontally compressed Jacobian multiplied by the error vector and the compressed weights update vector from the previous set of weights. The adjusting parameter and the weights update vector coefficient are then updated (AL-M2 Steps 6 and 7, respectively).

In some embodiments, the method compressing the Jacobian matrix may reduce the computational and/or memory cost for, e.g., calculating the Hessian (in, e.g., the L-M steps 4), since multiplication is performed with a matrix that is smaller than the original Jacobian; calculating the Hessian inverse (in, e.g., the L-M steps 5), since the Hessian obtained from the modified (L-M steps 4) is smaller than the original Hessian; or calculating the weights update vector in (L-M steps 6), since multiplication is performed with matrices smaller than the original Jacobian and Hessian inverse. In some embodiments, the method may also reduce the memory storage requirements of the Hessian matrix.

6. Compressing the Jacobian Matrix by Selective Column Elimination

Figure 15:
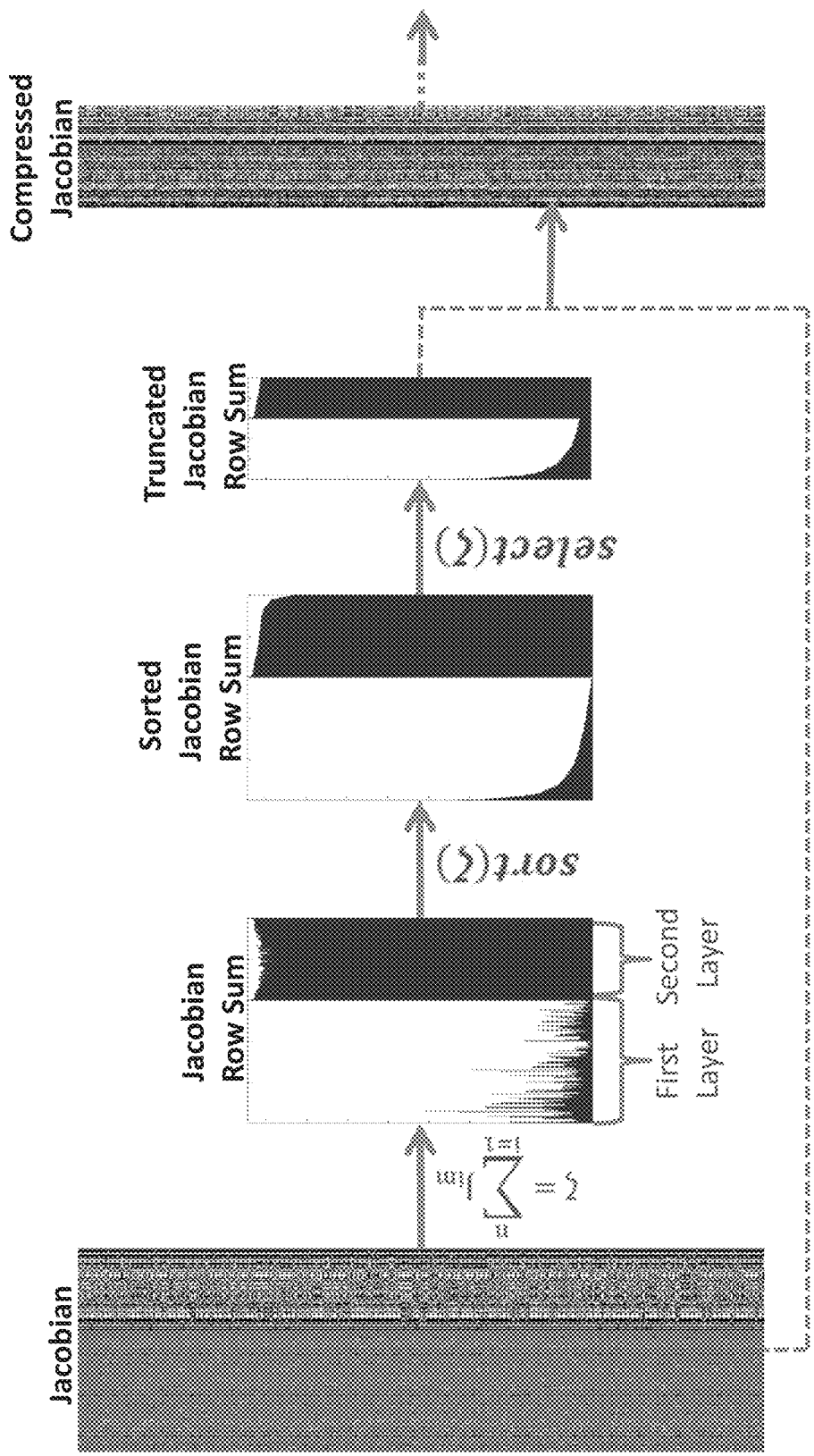
FIG. 15 illustrates a visual representation of a Jacobian matrix being compressed by selective column elimination.

FIG. 15 illustrates a visual representation of a Jacobian matrix being compressed by selective column elimination. In some embodiments (referred to as variation-1), letting ($\zeta$) be the vector representing the sum of the rows of the Jacobian, each element in ($\zeta$) may be a sum of all the elements of a column in the Jacobian and may correspond to a specific weight in the MLP. If considering a MLP with two layers such as the one shown in FIG. 10, two distinct parts may be usually observed in ($\zeta$). The first part corresponds to the weights of the first layer, and the second part corresponds to the weights of the second layer as shown in FIG. 15. The value of an element in ($\zeta$) relative to other elements in the same part is related to the value of the corresponding element in ($\Delta W$) relative to other elements in ($\Delta W$). Thus, relatively small values in ($\zeta$) may not have a big effect on updating the MLP weights and may be discarded. FIG. 15 shows that the element values in ($\zeta$) may be sorted from biggest to smallest. For example, element with the lower half of values are discarded from each part and the corresponding columns are selected from the Jacobian to obtain the compressed Jacobian. Then a compressed ($\Delta W$) is calculated. A full size ($\Delta W$) may be then obtained using interpolation values, e.g., zero filling, where the elements of ($\Delta W$) that have been discarded in the compression are approximated with zeros.

In some alternative embodiments (referred to as variation-2), instead of selecting columns based on ($\zeta$), the columns may be selected randomly. This means that not all the weights may be updated at each training iteration, where even high impact columns may be temporarily discarded. In some embodiments, all weights may be updated, though over several training iterations. For example, half the columns of the Jacobian are selected randomly in one iteration and the other half are selected randomly in the next iteration, thus all the MLP weights may be updated in, e.g., two iterations.

Figure 16:
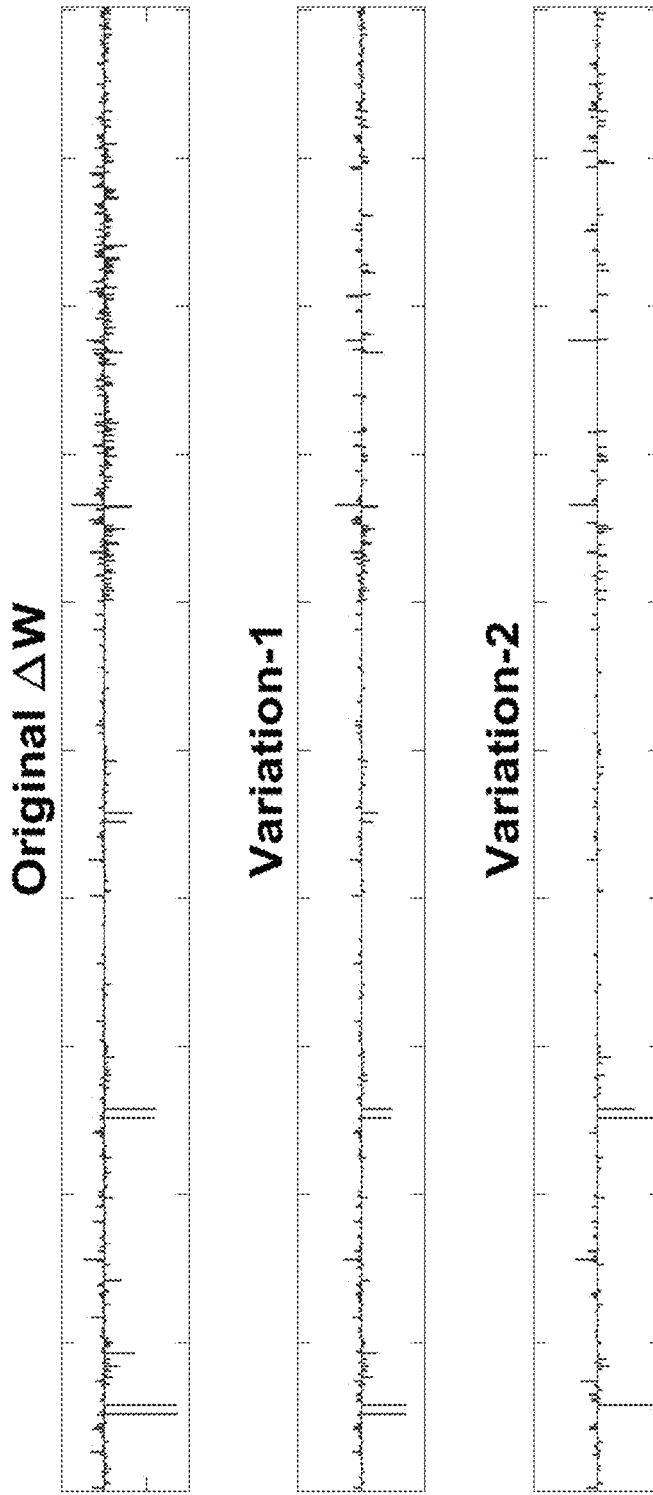
FIG. 16 illustrates examples of weights update vector after applying different ways of selecting and/or eliminating columns.

In some embodiments, the different ways of selecting and/or eliminating columns (e.g., variation-1 and variation-2) may be combined. For example, the columns may be selected based on ($\zeta$) to be discarded. Then the remaining columns may be selected randomly for the purpose of splitting the remaining columns over several iterations. FIG. 16 illustrates examples of weights update vector ($\Delta W$) after applying different ways of selecting and/or eliminating columns. In some other embodiments, the Jacobian matrix may be compressed vertically by discarding rows according to abs($\bar{e}$), the vector whose entries are the absolute values of the entries of the vector e, in a similar fashion to discarding columns according to (4).

7. Compressing the Hessian Matrix by Diagonal Elimination

Figure 17:
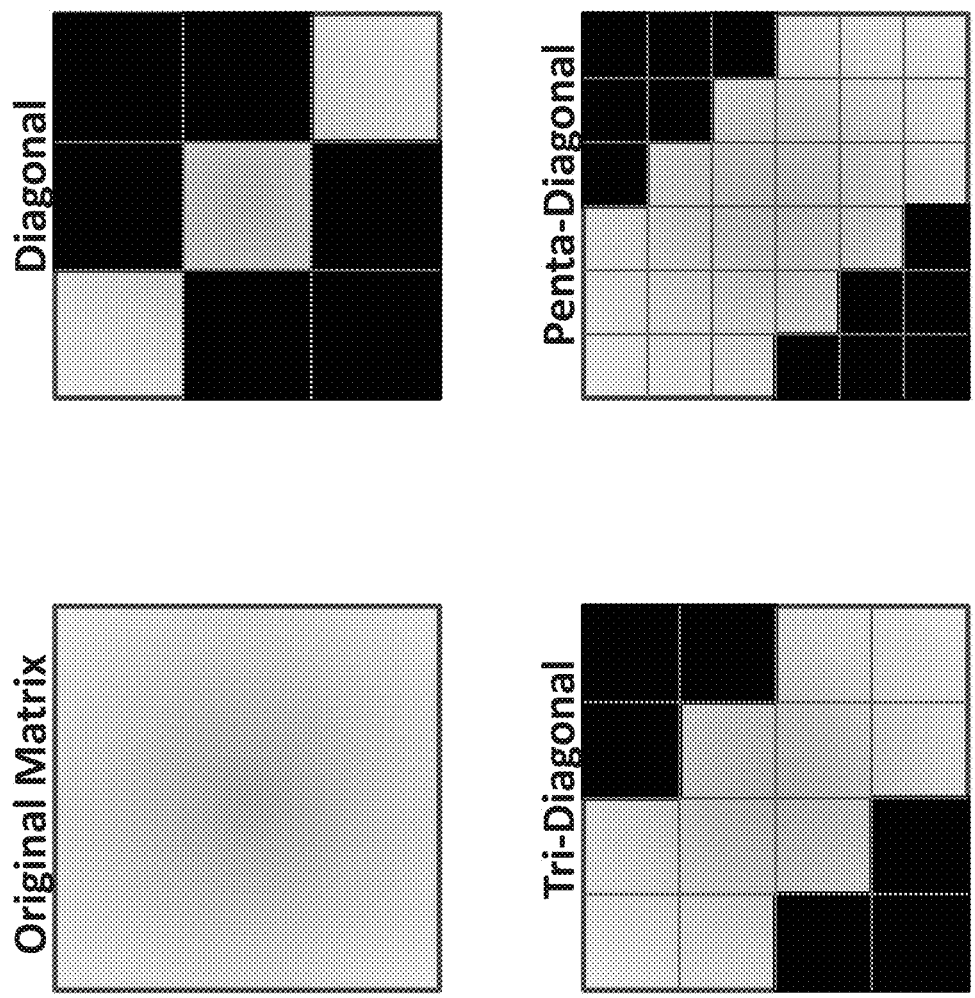
FIG. 17 illustrates various virtual representations of a Hessian matrix of which some blocks are discarded in a diagonal fashion.

In some embodiments, the Hessian matrix may be divided into blocks and one or more diagonal blocks may be discarded. FIG. 17 illustrates various virtual representations of a Hessian matrix of which some blocks are discarded diagonally. Discarding blocks diagonally as shown in FIG. 17 allows accelerating the computation of the inverse of the Hessian matrix, since the matrix becomes a diagonal block matrix, a tri-diagonal block matrix, or a penta-diagonal block matrix, etc. In some embodiments, other methods may be used for calculating the inverse. For example, for a diagonal block matrix, the inverse of the matrix may be directly obtained from the inverse of its blocks:

$$\begin{bmatrix} A & & \\ & B & \\ & & C \end{bmatrix}^{-1} = \begin{bmatrix} A^{-1} & & \\ & B^{-1} & \\ & & C^{-1} \end{bmatrix}$$

8. Compressing the Hessian Matrix in Transform Space

In some embodiments, the Hessian matrix may be compressed efficiently in a transform space. The transformation may be, e.g., Fourier transform, discrete cosine transform, or a combination thereof. The selection of the transform or a combination of transforms to apply may depend on the matrix structure, which in turn may depends on the NN model architecture. The Hessian matrix may be back-transformed to its original space using an inverse-transform operation (different from the inverse matrix operation). Parts of the transformed matrix may be discarded using methods (such as diagonal elimination) to reduce the computational complexity of inversion. The inverse matrix operation is then applied in a transform space. The inverse-transform is then applied to obtain the approximate Hessian inverse to be used for training.

Figure 18:
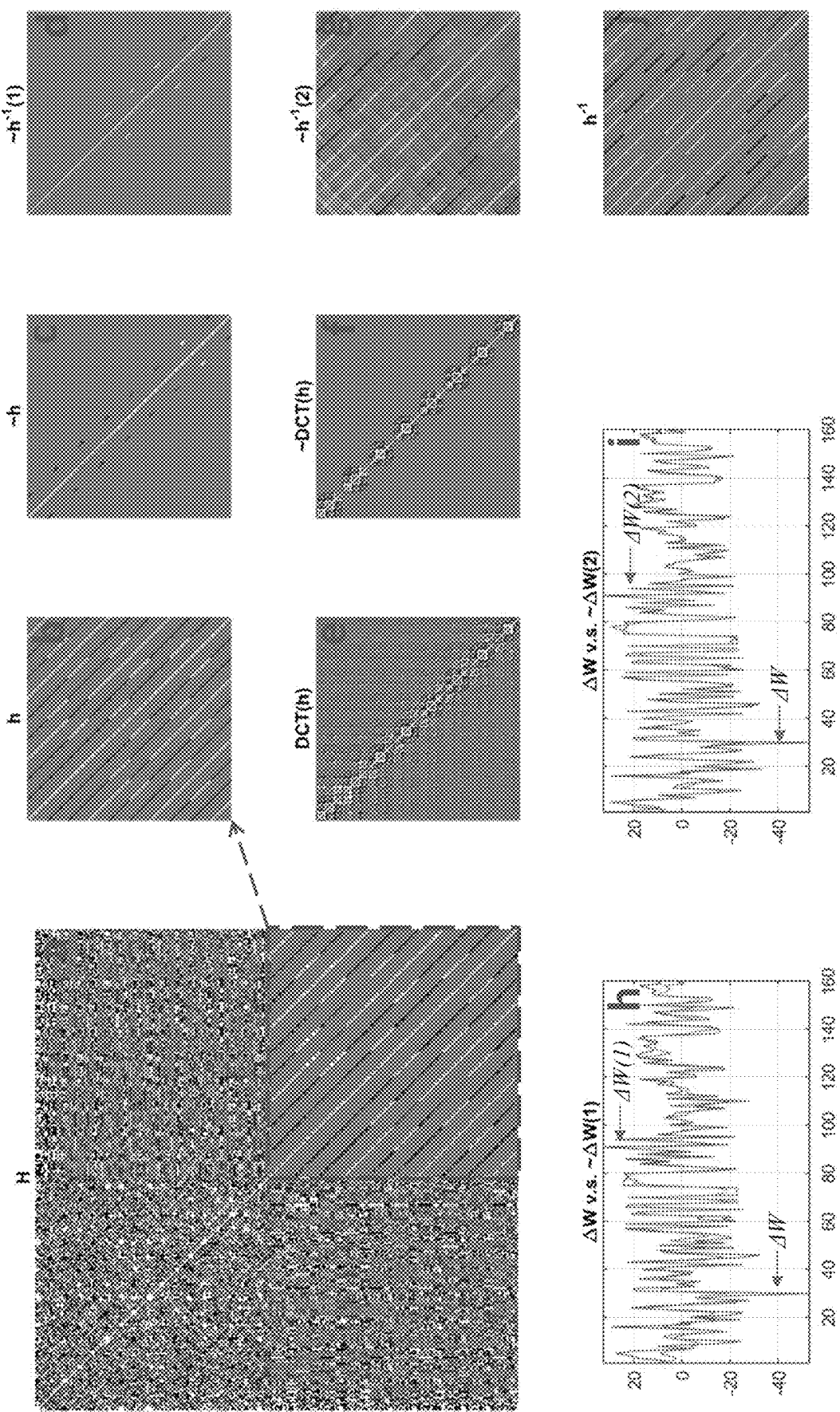
FIG. 18 illustrates a virtual representation of a process of compressing and inverting a Hessian matrix in transform space.

FIG. 18 illustrates a virtual representation of a process of compressing a Hessian matrix in a transform space. In some embodiments, different MLP architectures may have properties that can be utilized to select the most appropriate compression method. The Hessian matrix may be divided into blocks, where a different compression method can be applied to each block.

The Hessian matrix may be associated with, e.g., an auto-associative NN. Auto-associative NNs are MLPs with at least one hidden layer and equal number of inputs and outputs, where the training targets are the same as the network inputs. The auto-associative NNs demonstrate a specific kind of structure in at least a portion of the Hessian matrix, which corresponds to the relation among the output layer weights labeled "h" in FIG. 18, highlighted in part (a) of FIG. 18 and shown separately in part (b) of FIG. 18. In some embodiment, discrete cosine transform may be a suitable choice of transformation for the structure of Hessian matrix associated with the auto-associative NN.

FIG. 18 demonstrates how the discrete cosine transform on a part of the Hessian can enhance the resulting weights update vector (z W). For comparison, part (c) of FIG. 18 shows diagonal elimination applied to the matrix of part (b) of FIG. 18 in real space. Part (d) of FIG. 18 shows the inverse of the matrix of part (c) of FIG. 18. Part (e) of FIG. 18 is the discrete cosine transform of the matrix of part (b) of FIG. 18. Part (f) of FIG. 18 shows diagonal elimination applied to the matrix of part (e) of FIG. 18. Part (g) of FIG. 18 shows the inverse of the matrix shown in part (f) of FIG. 18. Part (j) of FIG. 18 shows a true inverse without approximation for comparison, which is the inverse of the matrix shown in part (b) of FIG. 18. Part (h) of FIG. 18 shows a comparison of weights update vectors. The true weights update vector ($\Delta W$) corresponds to the true inverse matrix shown in part (j) of FIG. 18. ($\sim\Delta W(1)$) represents the approximate weights update vector corresponding to using the matrix shown in part (d) of FIG. 18.

Part (i) shows another comparison of weights update vectors. ($\Delta W$) in part (i) of FIG. 18 represents the true weights update vector (without approximation). ($\sim\Delta W(2)$) represents the approximate weights update vector corresponding to using the matrix shown in part (g) of FIG. 18.

Figure 19:
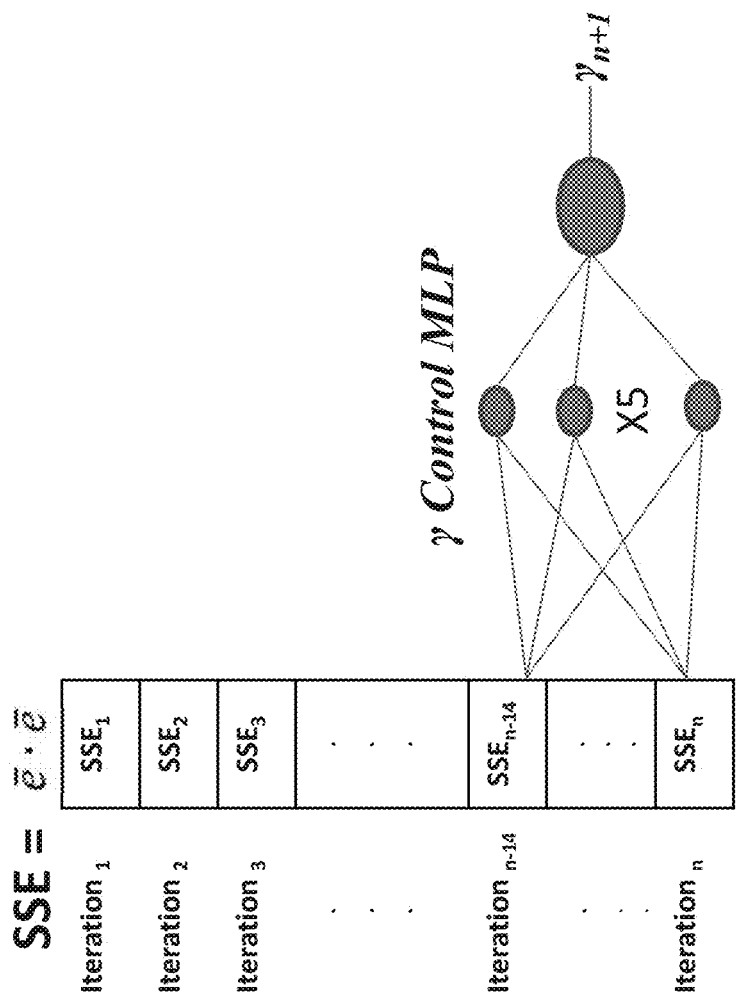
FIG. 19 illustrates an example of a parameter control MLP for controlling the value of weights update vector coefficient.

9. Adjusting Weights Update Vector Coefficient $\gamma$ and/or Order Parameter $\mu$ Via Adaptive Intelligent Control In some embodiments, a separate small ANN (referred to as $\gamma$ control MLP/ANN/NN) may be used to control the value of weights update vector coefficient ($\gamma$) based on, e.g., error history of past training iterations. FIG. 19 illustrates an example of a $\gamma$ control MLP for controlling the value of weights update vector coefficient. The $\gamma$ control MLP may have, e.g., 5 neurons in the first layer and 1 neuron in the output layer. The MLP may have, e.g., 15 inputs, which may represent the sum of the squares of the elements of the error vector (e) for the last 15 (or other numbers) training iterations. The MLP may have, e.g., one output, which may be the value of ($\gamma$) for the next iteration.

Figure 20:
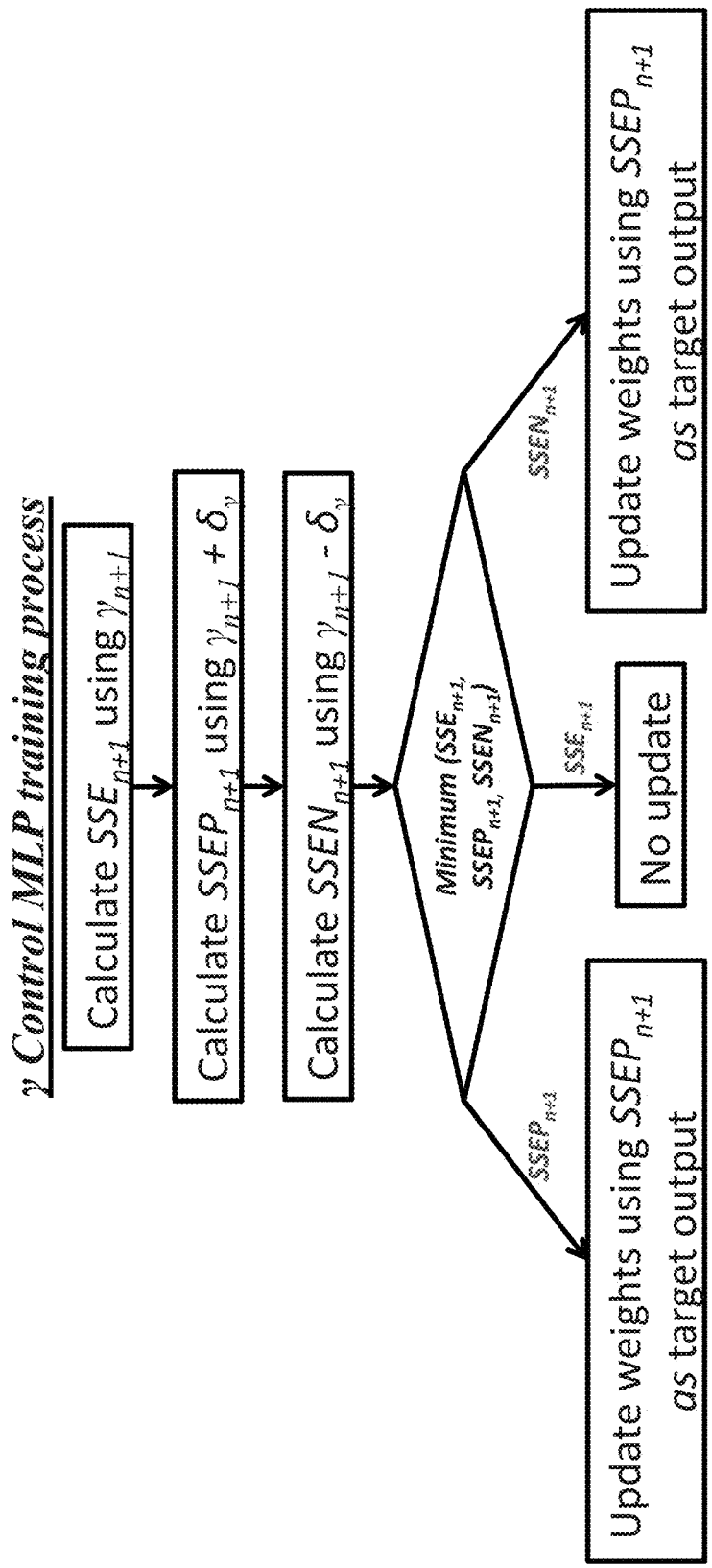
FIG. 20 illustrates an example of a process for updating the value of weights update vector coefficient by a parameter control MLP at each iteration of training.

FIG. 20 illustrates an example of a process for updating weights by a γ control MLP at each iteration of training. ($\delta_\gamma$) is a constant step size used to test the change in $\bar{e} \cdot \bar{e}$ at each training iteration, when the value of (γ) is increased or decreased. (SSEP) is the $\bar{e} \cdot \bar{e}$ value corresponding to increasing (γ) by ($\delta_\gamma$). (SSEN) is the $\bar{e} \cdot \bar{e}$ value corresponding to decreasing (γ) by ($\delta_\gamma$). SSE refers to the sum of squared errors. SSEP refers to the sum of squared errors for a positive step (increasing γ). SSEN refers to the sum of squared errors for a negative step (decreasing γ). In some other embodiments, other cost functions such as the sum of absolute errors (Li-norm) can also be used.

In some embodiments, another separate small ANN (referred to as μ control MLP/ANN/NN) can be used to adjust the value of the order parameter (μ) at each iteration in a similar fashion to the γ control MLP. In some embodiments, the μ control MLP may use, e.g., the same error history of past training iterations as input, where its output is μ instead of γ. In some embodiments, the μ control MLP and the γ control MLP may be implemented as a common parameter control MLP (or common parameter control NN).

10. Sample Results

FIGS. 21-26 illustrate sample results of a training of neural networks based on approximation of Jacobian and/or Hessian matrices. For the results shown in FIGS. 21-24, AL-M2 implementation from FIG. 11 is used. For the results shown in FIGS. 25-26, AL-M1 implementation from FIG. 9 is used. Intelligent parameter control methods are used to adjust weights update vector coefficient (γ) and order parameter (μ). For example, an example of a MLP (with 2 inputs, 2 outputs, 1000 neurons in its first layer and 2 neurons in its second layer) may be trained to simultaneously fit two functions:

$$f_1(x_1,x_2)=\sin(10*(x_1+x_2)_2),$$

$$f_2(x_1,x_2)=\cos(10*(x_1+x_2)_2),$$

Figure 21:
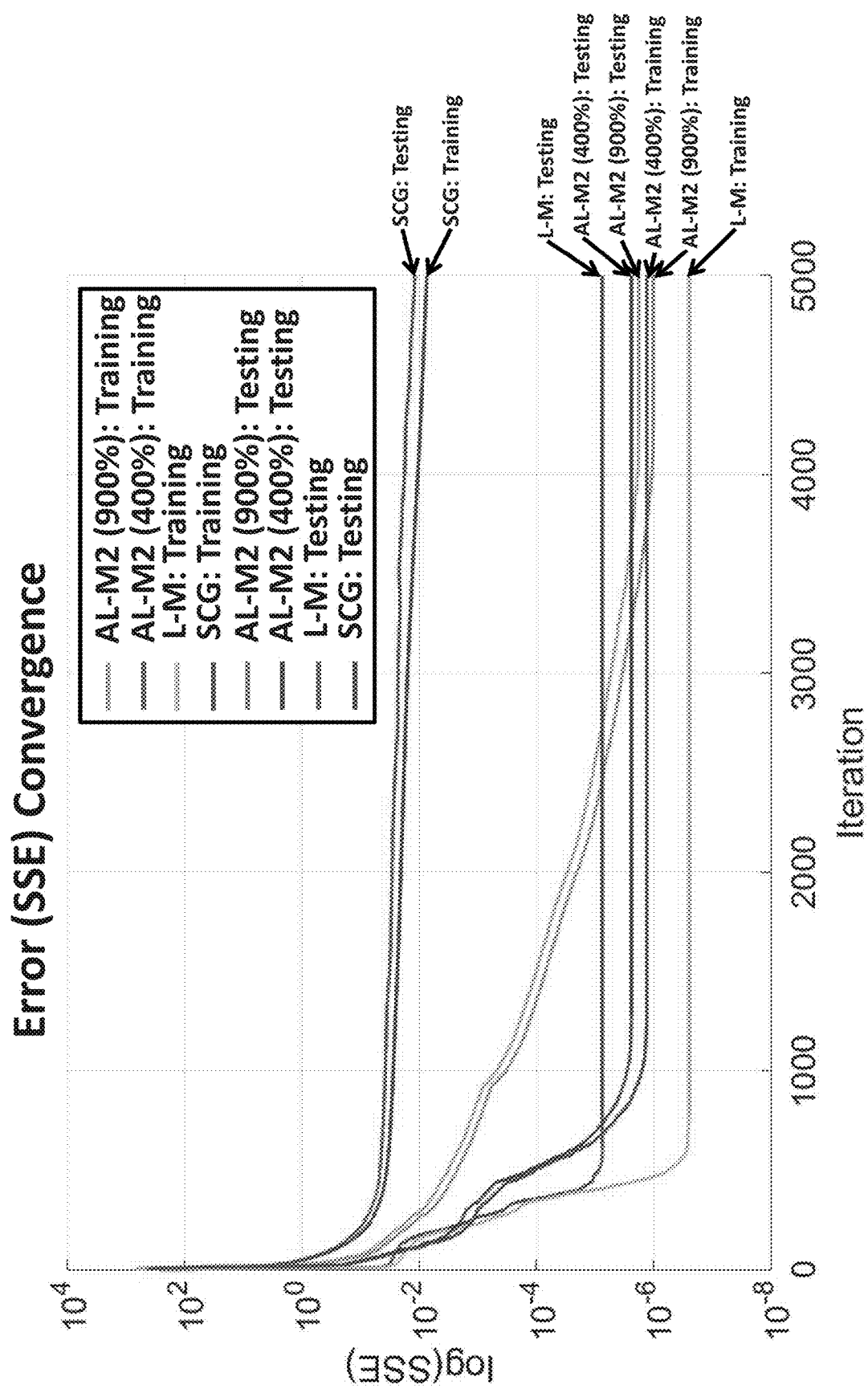
FIG. 21 illustrates a comparison of error convergence for a function fitting application using various neural network (NN) training methods.

FIG. 21 illustrates a comparison of error convergence using various neural network training methods. The curve labeled "AL-M2 (900%): Training" represents a training process using training data based on a L-M method accelerated by a 300% compression of a Jacobian matrix (and 900% compression of the Hessian matrix). The curve labeled "AL-M2 (900%): Testing" represents a testing process using test data based on the L-M method accelerated by the 300% compression of a Jacobian matrix (and 900% compression of the Hessian matrix).

The curve labeled "AL-M2 (400%): Training" represents a training process using training data based on a L-M method accelerated by a 200% compression of a Jacobian matrix (and 400% compression of the Hessian matrix). The curve labeled "AL-M2 (400%): Testing" represents a testing process using test data based on the L-M method accelerated by the 200% compression of a Jacobian matrix (and 400% compression of the Hessian matrix).

The curve labeled "SCG: Training" represents a training process using training data based on a scaled conjugate gradient (SCG) method. The curve labeled "SCG: Testing" represents a testing process using test data based on the SCG method.

The curve labeled "L-M: Training" represents a training process using training data based on a L-M method without acceleration. The curve labeled "L-M: Testing" represents a testing process using test data based on the L-M method without acceleration.

The various training methods of FIG. 21 are used to train an MLP. The same initial weights were used for each training method. FIG. 21 shows a comparison of error convergence for both training and testing data.

FIG. 22 illustrates a comparison of numbers of iterations taken by various training methods to achieve a maximum error ($L_\infty$ norm) below, e.g., 0.1. FIG. 23 illustrates a comparison of time taken by the "AL-M2 (900%)" method (the training process based on a L-M method accelerated by a 300% compression of a Jacobian matrix and 900% compression of a Hessian matrix) and the "L-M" method (the training process based on a L-M method without acceleration based on approximation of a Jacobian matrix or a Hessian matrix). FIG. 24 illustrates a comparison of matrix sizes used by the "AL-M2 (900%)" method and the "L-M" method. As shown in FIGS. 22-24, the overall speed-up per iteration for the operations involved may be 850%, and overall memory storage for the matrices may be reduced by 475%. Note that in at least some embodiments, for a fixed compression rate, as matrix size increases memory storage savings ratio may remain constant and speed-up ratio may increase. Further memory required by matrix operations is reduced, the amount depends on implementation. Speed-up ratio can be increased using parallel processing and specialized hardware.

FIG. 25 illustrates a comparison of error convergence using various neural network training methods. The curve labeled "AL-M1" represents a training process using training data based on a L-M method accelerated by a 625% compression of the Hessian matrix.

The curve labeled "SCG" represents a training process using training data based on a scaled conjugate gradient (SCG) method.

The curve labeled "L-M" represents a training process using training data based on a L-M method without acceleration.

The various training methods of FIG. 25 are used to train an MLP. The same initial weights may be used for each training method.

FIG. 26 illustrates a comparison of numbers of iterations taken by various training methods to achieve a maximum error (L-norm) below, e.g., 0.5.

11. System Architectures

Figure 27:
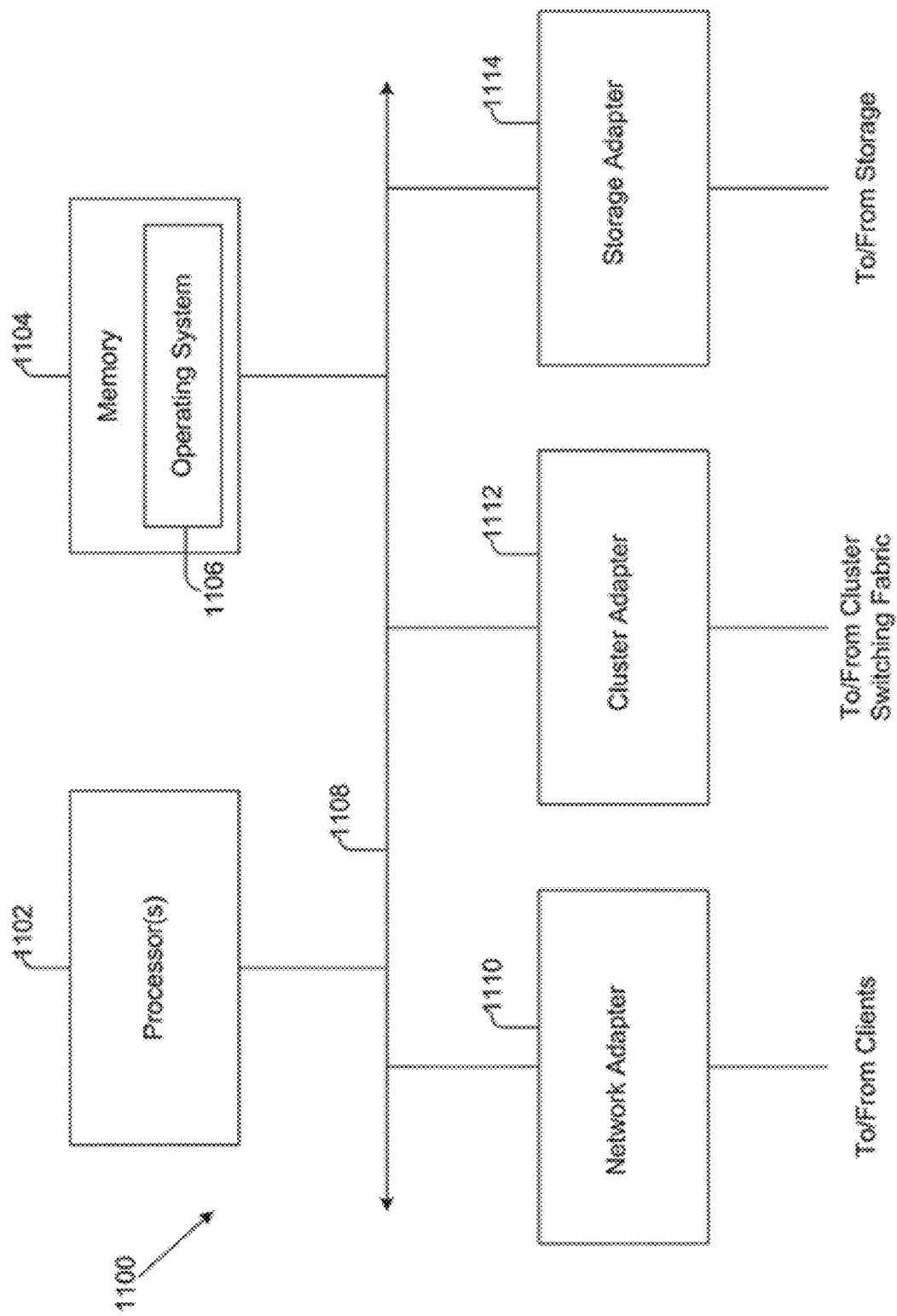
FIG. 27 is a high-level block diagram illustrating an example of a hardware architecture of a computing device that may perform various processes as disclosed.

FIG. 27 is a high-level block diagram illustrating an example of a hardware architecture of a computing device 1100 that may perform various processes as disclosed, according various embodiments of the present disclosure. The computing device 1100 may execute some or all of the processor executable process steps described herein. In various embodiments, the computing device 1100 includes a processor subsystem that includes one or more processors 1102. Processor 1102 may be or may include, one or more programmable general-purpose or special-purpose microprocessors, digital signal processors (DSPs), programmable controllers, application specific integrated circuits (ASICs), programmable logic devices (PLDs), or the like, or a combination of such hardware based devices.

The computing device 1100 can further include a memory 1104, a network adapter 1110, a cluster access adapter 1112 and a storage adapter 1114, all interconnected by an interconnect 1108. Interconnect 1108 may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire") or any other data communication system.

The cluster access adapter 1112 includes one or more ports adapted to couple the computing device 1100 to other devices. In the illustrated embodiment, Ethernet can be used as the clustering protocol and interconnect media, although other types of protocols and interconnects may be utilized within the cluster architecture described herein.

The computing device 1100 can be embodied as a single- or multi-processor storage system executing a storage operating system 1106 that can implement a high-level module, e.g., a storage manager, to logically organize the information as a hierarchical structure of named directories and files at the storage devices. The computing device 1100 can further include graphical processing unit(s) for graphical processing tasks or processing non-graphical tasks in parallel.

The memory 1104 can comprise storage locations that are addressable by the processor(s) 1102 and adapters 1110, 1112, and 1114 for storing processor executable code and data structures. The processor 1102 and adapters 1110, 1112, and 1114 may, in turn, comprise processing elements and/or logic circuitry configured to execute the software code and manipulate the data structures. The operating system 1106, portions of which is typically resident in memory and executed by the processors(s) 1102, functionally organizes the computing device 1100 by (among other things) configuring the processor(s) 1102 to invoke. It will be apparent to those skilled in the art that other processing and memory implementations, including various computer readable storage media, may be used for storing and executing program instructions pertaining to the disclosed technology.

The network adapter 1110 can include multiple ports to couple the computing device 1100 to one or more clients over point-to-point links, wide area networks, virtual private networks implemented over a public network (e.g., the Internet) or a shared local area network. The network adapter 1110 thus can include the mechanical, electrical and signaling circuitry included to connect the computing device 1100 to the network. Illustratively, the network can be embodied as an Ethernet network or a Fibre Channel (FC) network. A client can communicate with the computing device over the network by exchanging discrete frames or packets of data according to pre-defined protocols, e.g., TCP/IP.

The storage adapter 1114 can cooperate with the storage operating system 1106 to access information requested by a client. The information may be stored on any type of attached array of writable storage media, e.g., magnetic disk or tape, optical disk (e.g., CD-ROM or DVD), flash memory, solid-state disk (SSD), electronic random access memory (RAM), micro-electro mechanical and/or any other similar media adapted to store information, including data and parity information. The storage adapter 1114 can include multiple ports having input/output (I/O) interface circuitry that couples to the disks over an IO interconnect arrangement, e.g., a conventional high-performance, Fibre Channel (FC) link topology. In various embodiments, the cluster adapter 1112 and the storage adapter 1114 can be implemented as one adaptor configured to connect to a switching fabric, e.g., a storage network switch, in order to communicate with other devices and the mass storage devices.

Figure 28:
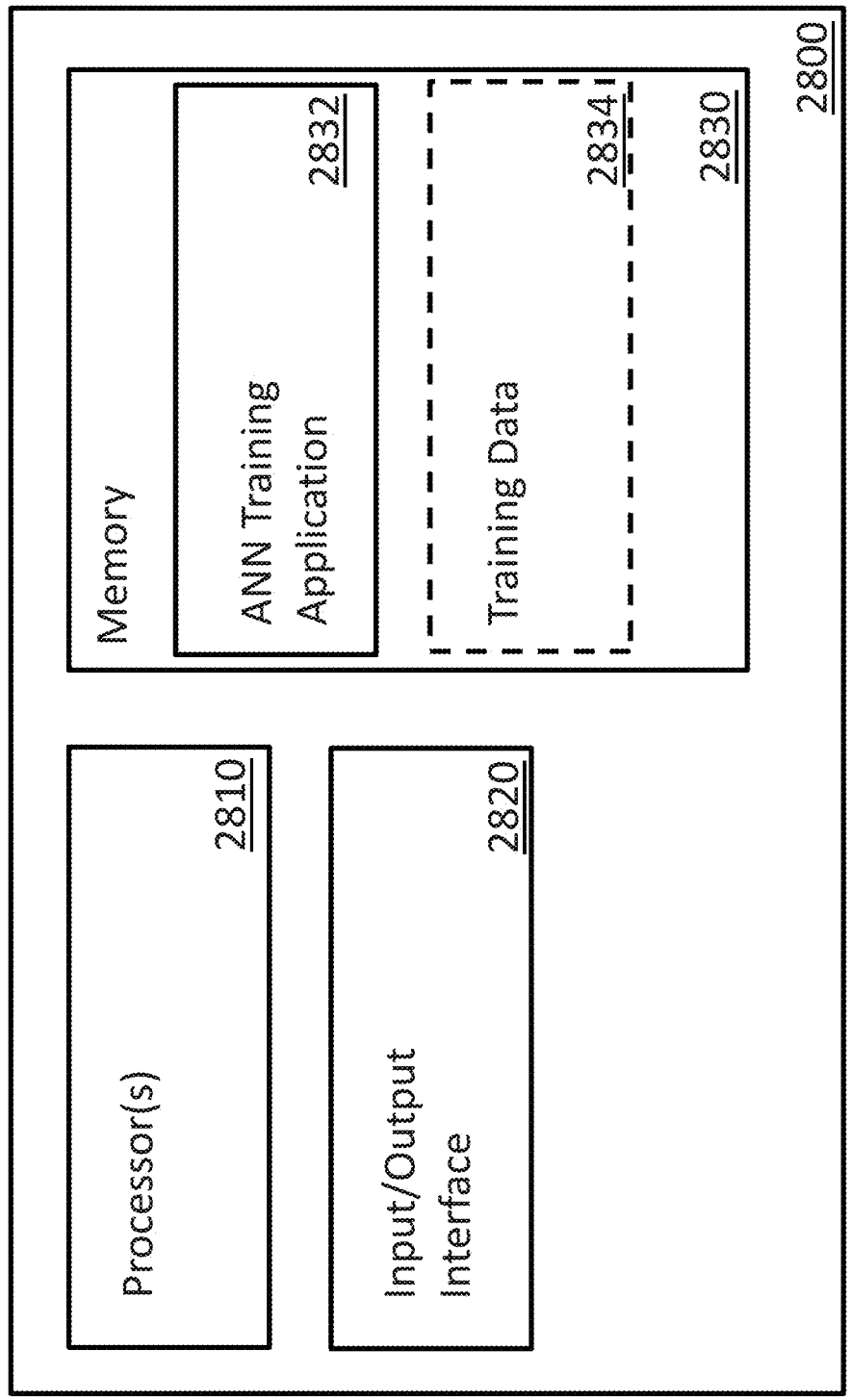
FIG. 28 is a high-level block diagram illustrating an example system architecture for a computing device that may perform various processes as disclosed.

Turning now to FIG. 28, a high-level block diagram illustrating an example system architecture for a computing device that may perform various processes in accordance with an embodiment of the invention is illustrated. Computing device 2800 includes one or more processors 2810, and an input/output interface 2820. Input/output interfaces can be used to communication with other computing devices, or other devices that can be used to provide data to, and extract data from, an ANN training system. The computing device 2800 further includes a memory 2830, which can be implemented using volatile, non-volatile, or a mixture of both volatile and non-volatile storage. The memory 2830 contains an ANN training application 2832. ANN training applications can direct processors to perform ANN training processes including those described herein. In a variety of embodiments, ANN training applications can direct processors of other computing devices to perform ANN training processes via the Input/Output Interface. In some embodiments, memory 2830 further contains training data 2834. In a variety of embodiments, training data is received via the input/output interface.

Figure 29:
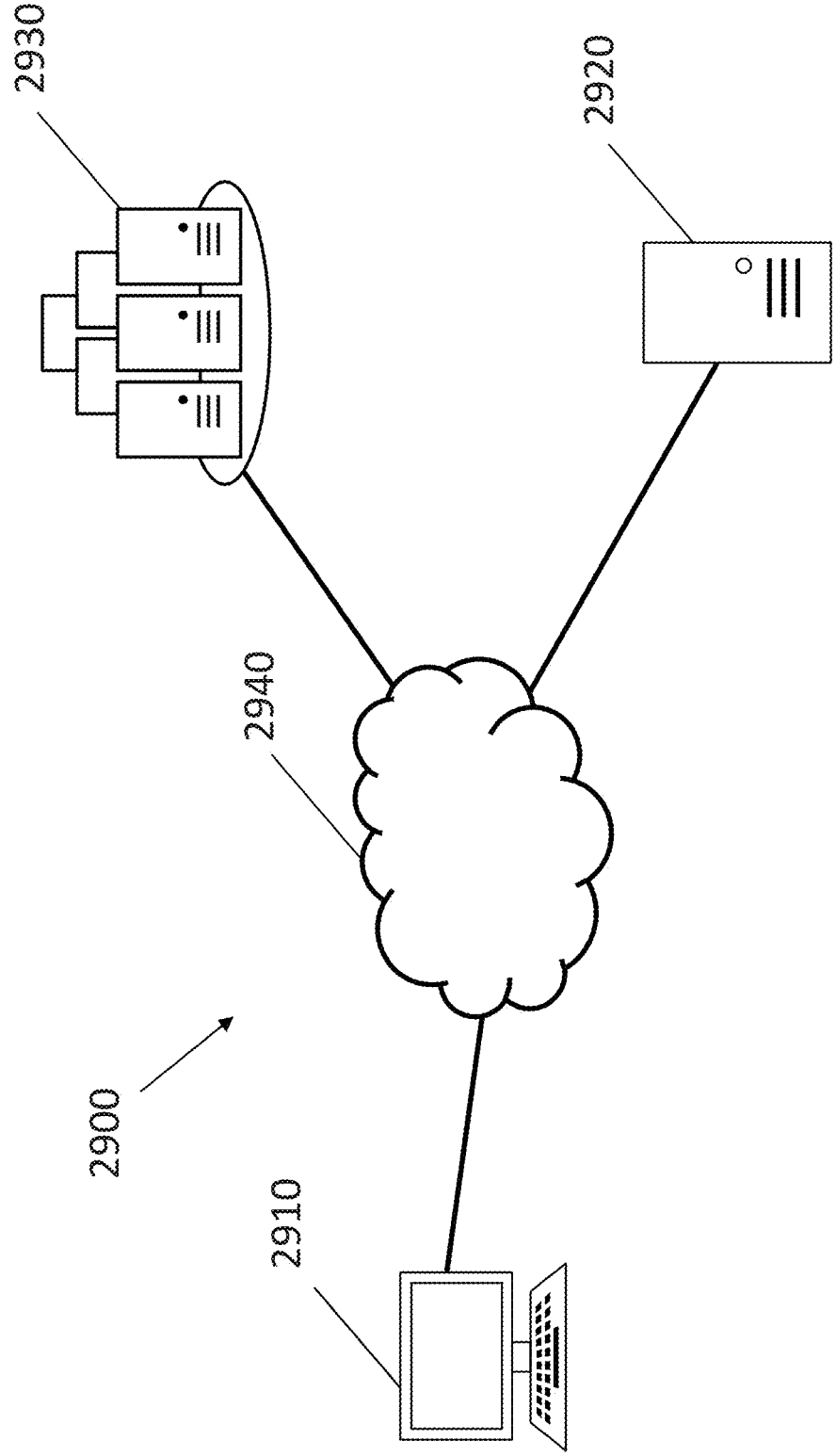
FIG. 29 is a high-level system diagram illustrating an ANN training system that may perform various processes as disclosed.

In many embodiments, training processes described herein are performed using distributed computing systems (e.g. cloud computing, computing clusters, or any other type of computer network as appropriate to the requirements of a given application of an embodiment of the invention). Turning now to FIG. 29, an example distributed computing system in accordance with an embodiment of the invention is illustrated. Distributed computing system 2900 includes an interface device 2910. Interface devices can be any device capable of interacting with a computing device as described above. In numerous embodiments, interface devices can be implemented using computing devices. In a variety of embodiments, interface devices can perform training processes described above, and direct other computing systems to perform various instances of similar processes. Interface device 2910 is connected to server 2920 and server cluster 2930 via a network 2940. Server 2920 is a computer system capable of performing training processes, whereas server cluster 2930 is a networked set of severs of which at least one is capable of performing training processes. In a variety of embodiments, servers and server clusters are capable as acting as one or more computing devices.

In many embodiments, training processes similar to those described above are capable of being performed in a parallelized fashion. For example, a numerous instances of various training processes can be performed in concert across multiple computing devices. Example methods of parallelization which can be applied to training processes can be found in U.S. Pat. No. 9,953,246, titled "Feature-Preserving Noise Removal" the entirety of which is hereby incorporated by reference. In some embodiments, parallelization can be directed using an implementation of blockchain technology, whereby $3^{rd}$ party computer systems that are active on the blockchain are instructed to perform training processes.

Amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations of the present disclosure.

What is claimed is:

1. A method of training an artificial neural network (ANN) for an artificial intelligence recognition, comprising:
    producing, by an ANN, outputs by feeding inputs of a training data set to the ANN;
    determining errors of the generated outputs from target outputs of the training data set;
    generating a first-order derivative matrix including first-order derivatives of the errors and a second-order derivative matrix including second-order derivatives of the errors;
    obtaining an approximation of the first- and second-order derivative matrices or an approximation of the second-order derivative matrix by compressing the first-order derivative matrix or the second-order derivative matrix by:
        converting the matrix to be inverted from real space to a transform space;
        performing a data compression of the matrix in a transform space;
        inverting the matrix in the transform space; and
        performing an inverse-transform operation to the inverted matrix; and
    updating weights of the ANN based on the approximation of the first-order derivative matrix or the approximation of the second-order derivative matrix.

2. The method of claim 1, further comprising:
    recognizing a face, a speech, handwriting, an image or an expression using the ANN.

3. The method of claim 1, further comprising: repeating the producing, the determining, the generating and the updating until a stopping criteria is met, wherein the stopping criteria including a maximum number of iterations, or a threshold for the errors.

4. The method of claim 1, wherein the ANN is a multi-layer perceptron (MLP) ANN model.

5. The method of claim 1, wherein the obtaining comprises: obtaining an approximation of the first-order derivative matrix and an approximation of the second-order derivative matrix by compressing the first-order derivative matrix and the second-order derivative matrix; and the updating comprises: updating weights of the ANN based on the approximation of the first-order derivative matrix and the approximation of the second-order derivative matrix.

6. The method of claim 1, wherein the obtaining comprising:
    decimating the first-order derivative matrix or the second-order derivative matrix horizontally and/or vertically.

7. The method of claim 6, wherein the obtaining further comprising:
    interpolating a decimated instance of the first-order derivative matrix or the second-order derivative matrix.

8. The method of claim 1, wherein the obtaining comprising:
    compressing the first-order derivative matrix by:
        selecting one or more columns of the first-order derivative matrix; and
        eliminating the selected one or more columns.

9. The method of claim 1, wherein the obtaining comprising:
    compressing the first-order derivative matrix by:
        selecting one or more rows of the first-order derivative matrix; and
        eliminating the selected one or more rows.

10. The method of claim 1, wherein the obtaining comprising:
    dividing the second-order derivative matrix into a plurality of blocks; and
    discarding one or more diagonal blocks of the plurality of blocks.

11. The method of claim 1, wherein the updating comprising:
    calculating a weights update vector based on an approximation of the second-order derivative matrix, a transpose of the first-order derivative matrix or an approximation of the first-order derivative matrix and the errors; and
    updating weights of the ANN using the weights update vector.

12. The method of claim 11, wherein the weights of the ANN is updated using the weights update vector multiplied by a weights update vector coefficient, and the weights update vector coefficient is adjusted during each training iteration.

13. The method of claim 12, further comprising:
    adjusting the weights update vector coefficient based on an error history of past training iterations.

14. The method of claim 12, further comprising:
    adjusting the weights update vector coefficient by a parameter control NN that receives the errors of past training iterations as inputs.

15. The method of claim 1, further comprising:
    updating an order parameter, the order parameter determining a degree to which a current iteration behaves as a second order or a first order.

16. The method of claim 15, wherein the order parameter is updated by a parameter control NN that receives the errors of past training iterations as inputs.

17. The method of claim 1, wherein the method is performed on at least two computing devices in a distributed computing system in parallel.

18. The method of claim 17, wherein the parallelized method is directed using a blockchain ledger.

19. A system for training an artificial neural network (ANN) for an artificial intelligence recognition, comprising:
    a processor; and
    a memory comprising an ANN training application, where the ANN training application directs the processor to:
        produce, by an ANN, outputs by feeding inputs of a training data set to the ANN;
        determine errors of the generated outputs from target outputs of the training data set;
        generate a first-order derivative matrix including first-order derivatives of the errors and a second-order derivative matrix including second-order derivatives of the errors;
        obtain an approximation of the first- and second-order derivative matrices or an approximation of the second-order derivative matrix by compressing the first-order derivative matrix or the second-order derivative matrix by:
converting the matrix to be inverted from real space to a transform space;
performing a data compression of the matrix in a transform space;
inverting the matrix in the transform space; and
performing an inverse-transform operation to the inverted matrix; and
update weights of the ANN based on the approximation of the first-order derivative matrix or the approximation of the second-order derivative matrix.

20. A method of training an artificial neural network (ANN) for an artificial intelligence recognition, comprising:
producing, by an ANN, outputs by feeding inputs of a training data set to the ANN;
determining errors of the generated outputs from target outputs of the training data set;
generating a first-order derivative matrix including first-order derivatives of the errors and a second-order derivative matrix including second-order derivatives of the errors;
obtaining an approximation of the first- and second-order derivative matrices or an approximation of the second-order derivative matrix by compressing the first-order derivative matrix or the second-order derivative matrix; and
updating weights of the ANN based on the approximation of the first-order derivative matrix or the approximation of the second-order derivative matrix by:
calculating a weights update vector based on an approximation of the second-order derivative matrix, a transpose of the first-order derivative matrix or an approximation of the first-order derivative matrix and the errors; and
updating weights of the ANN using the weights update vector.

* * * * *